US007813871B2

(12) United States Patent
Small et al.

(10) Patent No.: US 7,813,871 B2
(45) Date of Patent: Oct. 12, 2010

(54) METHODS AND SYSTEMS FOR AIRCRAFT DEPARTURE ENHANCED SITUATIONAL AWARENESS AND RECOVERY

(75) Inventors: Gregory J. Small, Federal Way, WA (US); Lee S. Hall, Seattle, WA (US); Rajit Jain, Kenmore, WA (US); Gerald R. Cutler, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 1036 days.

(21) Appl. No.: 11/548,619

(22) Filed: Oct. 11, 2006

(65) Prior Publication Data

US 2008/0010005 A1 Jan. 10, 2008

Related U.S. Application Data

(63) Continuation-in-part of application No. 11/456,418, filed on Jul. 10, 2006.

(51) Int. Cl.
*G01C 5/00* (2006.01)
*G06G 7/76* (2006.01)

(52) U.S. Cl. ............................... 701/120; 701/3; 701/9; 701/10

(58) Field of Classification Search ......... 701/200–213, 701/300, 301, 120, 15, 3, 9, 10; 342/28, 342/29, 70, 71, 195, 357.06, 357.08; 340/961
See application file for complete search history.

(56) References Cited

U.S. PATENT DOCUMENTS 5,714,948 A 2/1998 Farmakis et al.
6,003,808 A 12/1999 Nguyen et al.
6,125,312 A 9/2000 Nguyen et al.
6,161,097 A 12/2000 Glass et al.
6,529,620 B2 3/2003 Thompson
6,567,729 B2 5/2003 Betters et al.
6,725,137 B2 4/2004 Eagleton et al.
6,728,610 B1 4/2004 Marshall et al.
6,738,748 B2 5/2004 Wetzer
6,744,396 B2 6/2004 Stone et al.
6,772,098 B1 8/2004 Stark et al.
6,778,906 B1 8/2004 Hennings et al.
6,816,762 B2 11/2004 Hensey et al.
6,847,872 B2 1/2005 Bodin et al.

(Continued)

OTHER PUBLICATIONS

International Search Report, PCT US07/13330, dated Dec. 18, 2008, pp. 7.

(Continued)

*Primary Examiner*—Richard M. Camby
(74) *Attorney, Agent, or Firm*—Armstrong Teasdale, LLP

(57) ABSTRACT

A method for providing an enterprise with a situational awareness for conditions related to aircraft departure is described. The method includes receiving data related to one or more events that have the potential to affect conditions related to an aircraft's departure from a plurality of enterprise related systems, correlating the received data in accordance with one or more business rules, generating an aircraft departure situational awareness data set from the correlated data, processing the aircraft departure situational awareness data set in view of at least one user profile, and providing at least one recommendation, each recommendation associated with one user profile, directed to addressing the conditions related to aircraft departure.

42 Claims, 13 Drawing Sheets

U.S. PATENT DOCUMENTS

| | | | |
|---|---|---|---|
| 6,885,921 | B1 | 4/2005 | Farmer |
| 6,901,318 | B1 | 5/2005 | Morronigiello et al. |
| 6,952,828 | B2 | 10/2005 | Greene |
| 6,965,816 | B2 | 11/2005 | Walker |
| 7,006,903 | B2 | 2/2006 | Smith et al. |
| 7,031,941 | B2 | 4/2006 | Garrow et al. |
| 7,053,767 | B2 | 5/2006 | Petite et al. |
| 7,068,301 | B2 | 6/2006 | Thompson |
| 7,069,121 | B1 | 6/2006 | Cummings, Jr. et al. |
| 7,069,261 | B2 | 6/2006 | Ahl et al. |
| 7,098,810 | B2 | 8/2006 | Bateman et al. |
| 7,259,693 | B2 | 8/2007 | Miller et al. |
| 7,333,887 | B2 | 2/2008 | Baiada et al. |
| 2003/0191678 | A1 | 10/2003 | Shetty et al. |
| 2004/0008253 | A1 * | 1/2004 | Monroe ...................... 348/143 |
| 2005/0187677 | A1 | 8/2005 | Walker |
| 2006/0095156 | A1 | 5/2006 | Baiada et al. |
| 2006/0112139 | A1 | 5/2006 | Maple et al. |
| 2008/0010004 | A1 | 1/2008 | Small et al. |
| 2008/0010107 | A1 | 1/2008 | Small et al. |
| 2008/0046167 | A1 | 2/2008 | Small et al. |

OTHER PUBLICATIONS

Unknown, PCT Written Opinion regarding PCT/US07/13334, Oct. 28, 2008, 6pgs., International Searching Authority, Netherlands.

Richard M. Camby, Office Action mailed from the USPTO in U.S. Appl. No 11/456,418, Aug. 25, 2009, 15 pgs., US.

USPTO Office Action, U.S. Appl. No. 11/456,450, Sep. 15, 2009.

USPTO Office Action, U.S. Appl. No. 11/456,418, Aug. 25, 2009.

International Search Report and Written Opinion of PCT/US 07/13329, Dec. 18, 2008.

* cited by examiner

250

800

The Airline as information provider

METHODS AND SYSTEMS FOR AIRCRAFT DEPARTURE ENHANCED SITUATIONAL AWARENESS AND RECOVERY

CROSS-REFERENCE TO RELATED APPLICATIONS

This application is a continuation-in-part application of application Ser. No. 11/456,418, filed Jul. 10, 2006, and incorporated by reference herein in its entirety.

BACKGROUND OF THE INVENTION

This invention relates generally to systems and methods for enhancing aircraft departure situational awareness and recovery where participating automated systems may be on board aircraft, on the ground, or both.

In 2005, airlines moved nearly five million people over 40 million miles every day. However, airlines do not make optimal use of their aircraft and personnel. Airlines do not capitalize on existing information residing in various systems because each system solves a niche problem. By understanding the interrelated factors (weather, unscheduled equipment maintenance, late airplane arrivals, late passengers, crew shortages and legality, aircraft loading, regulatory authority practices, etc.) that can delay an aircraft turn at a gate of an airport, situational awareness of actual events in relation to the flight schedule can provide information to maximize profits.

Situation awareness communications are not limited to gathering and presenting data from a plurality of aircraft systems when the aircraft is in the air, but also includes gathering data when the aircraft is on the ground. Situation awareness communication is generally bidirectional. As used herein, the term aircraft refers to airplanes, helicopters, missiles and any object capable of flight.

Situational awareness is a term that may be used to refer to the degree of accuracy by which one's perception of their current environment mirrors reality. It is the ability to identify, process, and comprehend the critical elements of information about what is happening in a person's respective environment with regards to a mission, for example, airline operations. More simply, it is knowing what is going on around you. Different groups of people and different people within a group need different information to be aware of different aspects of a situation in order to determine a proper resolution to the situation. When an enterprise loses situational awareness, there is increased potential for human error and other mishaps.

Situation awareness has traditionally been confined to ground based systems with ground based presentation to ground based users. Increasingly sophisticated on board automated aircraft systems and aircraft communication systems provide the opportunity for the aircraft, whether in the air or on the ground to be in communication in real time with systems on the ground. For example, airline, airport station, maintenance operations, and business functions have traditionally been complex, and characterized by failures in situational awareness. In the future, these airline operations will be even more complex because more information will be available from the aircraft to make decisions. The challenge is interpreting and relating this data in order to enhance situational awareness. A desired state of situational awareness includes the gathering of data from many sources, filtering it according to the characteristics of the current situation and presenting the critical information to the right people, on and off the airplane, as it is occurring. Such a system will eliminate information overload and poor communications.

BRIEF DESCRIPTION OF THE INVENTION

In one aspect, a method for providing an enterprise with a situational awareness for conditions related to aircraft departure is provided. The method includes receiving data related to one or more events that have the potential to affect conditions related to an aircraft's departure from a plurality of enterprise related systems and correlating the received data in accordance with one or more business rules. The method also includes generating an aircraft departure situational awareness data set from the correlated data, processing the aircraft departure situational awareness data set in view of at least one user profile, and providing at least one recommendation, each recommendation associated with one user profile, directed to addressing the conditions related to aircraft departure.

In another aspect, an aircraft departure situational awareness system is provided. The system comprises at least one user interface, a plurality of enterprise systems, an integration system, and a decision support system. The integration system is networked to the user interface and configured to receive data relating to aircraft departure situational awareness from the plurality of enterprise systems. The decision support system is integrated with the integration system and the user interface. The decision support system is operatively configured to correlate situational information that has the potential to affect conditions related to aircraft departure received from the plurality of enterprise systems with one or more business rules received from the integration system. The decision support system is further configured to generate an aircraft departure situational awareness data set from the correlated data, process the aircraft departure situational awareness data set in view of at least one user profile, and provide at least one recommendation for display on at least one of said user interfaces. Each recommendation is associated with a user profile, and directed to addressing the conditions related to aircraft departure.

Embodiments may be implemented as a computer process, a computer system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Figure 1:
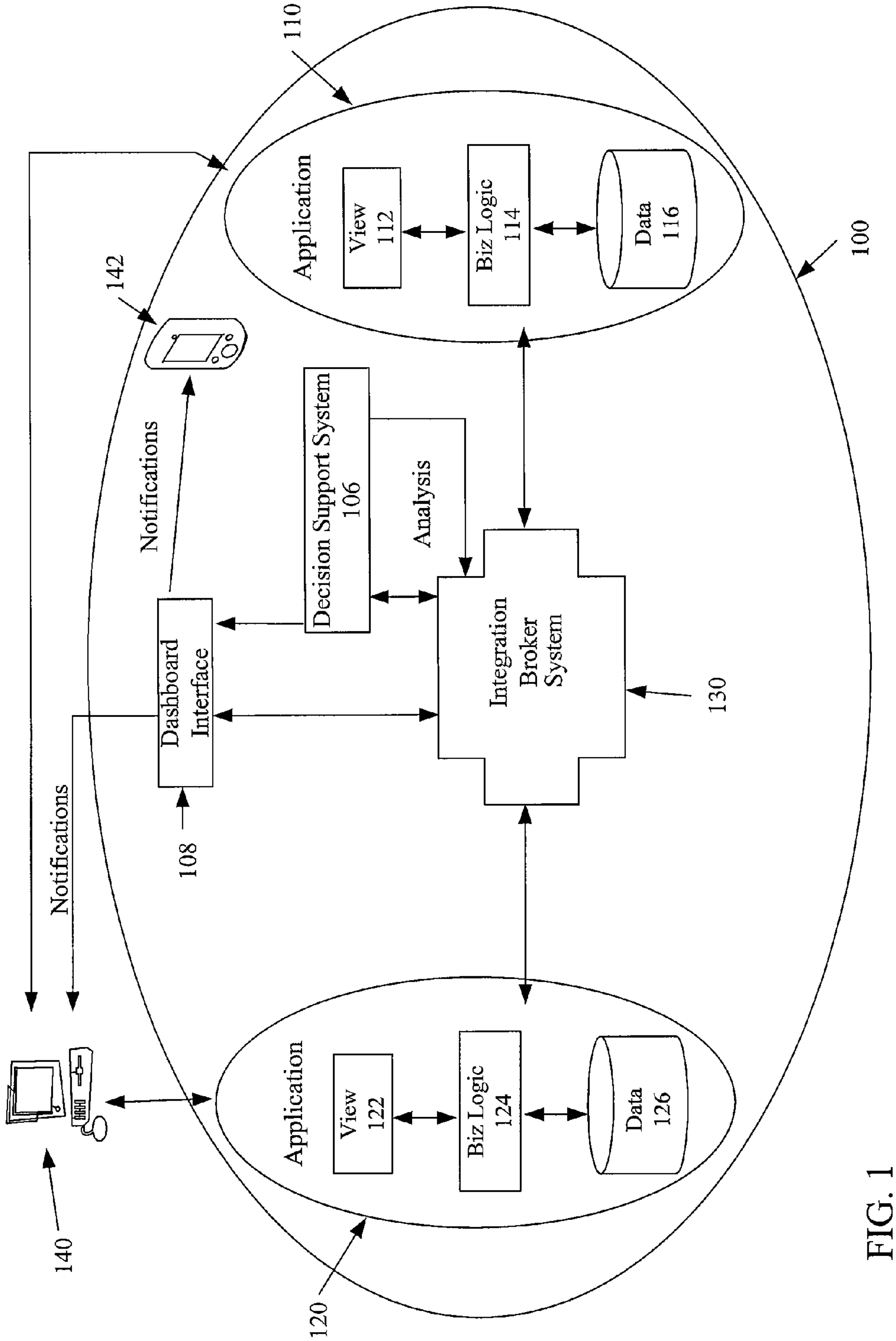
FIG. 1 is a diagram illustrating an exemplary situational awareness system, according to one embodiment.

Situational awareness can be defined as all the information necessary for a system operator to have an optimized understanding of the current operational environment that enables efficient decision-making. An operator of such a system is in a state of situational awareness when they have an accurate perception and understanding of the critical factors and conditions within a specific domain that can affect their successful operation within an environment. In broad terms, situational awareness is a term used to describe a human operator's perception of reality. Based on the interpretation of available information the operator will, at any given time, hold a set of beliefs about what is happening in the world around him and what action he should take. If a discrepancy exists between his beliefs and the reality of the situation (as might occur in conditions of high mental or physical workload, or as a result of the poor display of information), situational awareness becomes degraded, possibly leading to a chain of errors.

Real-time aircraft departure situational awareness systems, as described herein, provide a holistic view of an entire enterprise through intuitive screen views and auditable reports to support real-time decision-making. These systems solve the lack of reliable real-time operational decision-support data by providing better quality, more consistent, up-to-date, and actionable data on the facets of a situation while it is occurring. An approach to aircraft departure situational awareness is to provide tools, as described herein, that improve aircraft turn operational reliability, effectiveness and efficiency while maintaining operational safety. More specific to airplane dispatch situational awareness, a system is described herein that provides, for example, the completion status aircraft departure activities. Examples of such activities includes, for example, catering, fueling, cleaning, passenger de-boarding, passenger boarding, maintenance, and other activities as described below. The described system gathers data from airplane sensors, ground systems (both airport and airline based) and mobile device inputs which contains event information for planners and schedulers to monitor the status of aircraft departure.

As a result, the present invention is described in the context of an airline operations environment. Notwithstanding, it is to be understood that situational awareness systems and methods apply to any environment whereby an operator or system user is required to interpret information from multiple systems in order to have an accurate perception and understanding of all the factors and conditions within a specific domain in which they are operating. Using the data available from various systems in an operational environment, a situational awareness tool will interpret the data and present it in a form that improves decision-making with respect to ground operations.

In the aircraft departure environment, airline operational managers have traditionally relied upon management decision making tools which may be collectively referred to as "rules of thumb". The rules of thumb are based on systems operation procedure manuals, policy and procedures hosted in static text documents, files in reservations systems, and developed from years of operational and individual experience. As a result, stakeholders do not have a shared near real time operational view and consequently cannot anticipate aircraft departure issues arising, cannot move resources to areas of need, cannot determine the reason an aircraft departed late, are overwhelmed with tools and information and therefore cannot find or process data to make the best decision to try to bring airplane departure tasks back on schedule. There are many tasks involved to prepare an airplane for departure. This includes, but is not limited to airport and airline management and operations tasks such as removing and loading luggage and cargo, fueling, maintenance, and loading crew and passengers. If one of the departure tasks deviates from the schedule the impact to that airplane departure time and the entire airline's departure plan could be affected. Consequently, having near real time information from a system that provides information on the progress of these tasks can help airline and airport personnel make improved operational decisions. Data can come from one of many systems. Data can originate from the airplane, maintenance systems, airline systems, airport systems, aircraft supplier systems, regulatory authority systems, and/or independent airport service provider systems. By correlating information from these data sources, personnel can better understand the likelihood of an airplane departing on time. Additionally, stakeholders are not sharing and notifying others of deviations from the aircraft departure plan. For example, identification of how maintenance affects the dispatch readiness of the aircraft and other airline factors is needed.

Operational efficiency is a key metric for airlines. Currently, airlines are making decisions based on historical trends, rules of thumb, and not on real time data. Therefore all the decision making is based on after the fact analysis. Simply put, the current way airlines conduct business is to attempt to use historical data to implement improved processes for the future. This operational culture does not adequately support the adaptability that is needed for a successful airline in the highly dynamic world of commercial aviation operations.

By utilization of the above described rules of thumb, airline operational managers tend to implement the first feasible solution within limited time constraints as the air transportation industry has always been about reaction time. Rather than being reactive, it would be preferable, for example, if mechanics knew ahead of time the condition of the airplanes coming to their sites, and could estimate the time it may take them to complete the maintenance prior to the airplane arriving, and how best to address the problems those airplanes have. It also would be preferable if airline flight operations centers knew that they will have the aircraft and crew they need in the right places for upcoming flights. It would be preferable if ground operations knew where to bring fuel and catering items to service their gates and if passenger services knew, for example, the status of connecting flights, connecting passengers, special passenger handling requirements, group travel, and equipment serviceability. Maintenance operations need to know the entire operational picture to best deploy resources. In short, adapting to uncontrollable events is crucial for successful airline operations.

The methods and systems described herein include embodiments for the collection, analysis and presentation of information regarding status of multiple airplanes, airport operations, vendor operations, and airline operations to give an overall view of the health of an airline operation. Examples of such status information includes, but is not limited to, maintenance status, crew status, airport operation status, and flight revenue. In specific embodiments, views of the number of operations including one or more of flight operations, airplane turns, line maintenance, and others that are occurring as planned, those that are occurring within acceptable variance, and those which have exceeded planning ranges are provided. Additionally, such views also provide a trend line which allows a user to understand the relationship of the situation with the expected near term future based on the trend.

Various embodiments include views of one or more of current and near future resource utilization. These embodiments provide a relationship of a current airline operation situation against an airline operation plan and against a predefined utilization of airline resources, which are also sometimes referred to as assets. One specific example of an airline operation resource includes the employees of the airline and non-employees (contractors and other support personnel) that provide various services directed toward airline operation. Examples include, but are not limited to, airline crew (i.e., pilots and flight attendants, both active and reserve, mechanics, baggage handlers, gate agents, reservation agents, customer service agents, airline operations staff, maintenance operations staff, station operation staff (by station) Assets that are utilized in airline operation include, but are not limited to, airplanes, hanger bays, tools, ground equipment, and terminal gates at airports.

A resource utilization view embodiment consolidates information regarding the real time use of resources. The aviation industry is asset intensive, and knowing if all assets and resources are being used effectively can help manage better operations. In this resource utilization view, the provided information reveals to the user how assets are being used relative to the capacity for those assets. The system is configured to then assist the user in allocating those assets and resources across the enterprise. For example, if an airline has many maintenance or repair stations located across the world, it is valuable to know the capacity to accept unplanned maintenance at each of these maintenance/repair stations. Capacity for each station can be determined by a function of the tools, people, a qualification of the people, and time (assets) that are allocated for planned maintenance. A maintenance planner can then determine if that station has the capacity to accept more work or is likely to accept more work.

In one example scenario, it is determined that unscheduled maintenance is needed on an aircraft of the fleet. An operator, or user, of the system configured for resource utilization management operates the system to assess resource utilization at the possible repair stations, and then pick the repair station, capable of performing the unscheduled maintenance, that is least utilized. As a result, the impact to overall airline operations is minimized.

In various embodiments, capacity for other assets, including personnel assets such as flight crews, mechanics and ramp personnel can be determined. With this information, an airline can determine if they are under utilizing, over utilizing or optimally utilizing the resources with the perspective of a dynamic changing schedule.

Tracking assets in this fashion provides an airline with a global (e.g., world-wide) unified perspective on asset management, including, but not limited to, resource utilization (both people and hardware assets) and flight following. Flight following refers to a situation of knowing an aircraft's position in relation to flight schedules, airport schedules, repair station schedules and maintenance schedules, thereby reflecting potential impacts to assets and resources from an overall airline system perspective. The global perspective allows for a planner to implement, for example, buffer times between scheduled events such as: airline future planned schedules and actual schedule for the current day with reference to a future maintenance schedule plan and an actual maintenance schedule for the current day and with reference to a future planned schedule for a maintenance station and actual usage of the maintenance station for the current day.

In one specific embodiment, the global unified perspective view is a set of information that brings airline operational data together onto a single screen. For example, and in one embodiment, a world map serves as a backdrop on the screen, and a user is able to view resources, assets, and weather information and manipulate the above to smoothly solve, for example, a scheduled maintenance problem, with minimal or no disruption to the overall operation of the airline. Examples of the information that may be overlaid on such a display screen, or printout thereof, include, but is not limited to, flight following information, which is essentially information informing the user of aircraft location, which airport operations are a cause of concern for today, where can weather affect today's airline operations, what is a status of the airline supply chain, and what are the passenger (and/or cargo) loads around the world. Such information is useful when attempting to plan resource allocations.

Such a system view affords a user the ability to drill down so that information can be quickly assessed, such as alerts, allowing the user to focus on solving any problems at hand.

With a global unified view of information, operators will be able to at first glance gain a better understanding of global operations for which they are responsible. For example, in this embodiment, flight following information is correlated with one or more of flight schedules, airport schedules, maintenance schedules, and repair station schedules for each of the destinations for the aircraft. By combining, for example, the maintenance schedule information with fault messages received from the aircraft, maintenance planners are able to determine a likelihood for a specific aircraft to be serviced at one of its destinations. In this embodiment, a portion of the information available to the users is an integrated schedule of station operations, maintenance operations and flight operations. By combining this scheduled information with real time data, users can determine buffers between scheduled events and the feasibility of meeting aircraft maintenance schedules.

In another specific embodiment, an aircraft dispatch situational awareness model is utilized to gather and display a set of information that brings airline dispatch data together onto a single display, or screen. Particularly an aircraft dispatch process model represents a subset of generic airline functions (or components) and information interactions (connectors) for an enabled aircraft dispatch product. The following sections describe facets, including data sources, of the enabled aircraft dispatch product in terms of a functional decomposition and information flows, and include, for example, flight operations, customer service, maintenance operations, airline governance, and external relationships.

Flight Operations

One facet of the enabled aircraft dispatch product includes flight operations, which, in one example embodiment, includes a business function relating to airline operational control, which further includes additional business sub-functions, such as and for example, brief flight operations staff, manage system operations, dispatch and operations control, route airplanes, crew tracking, crisis management, and train flight operations staff. Another flight operations business function relates to the airplane itself, and in an example embodiment includes business sub-functions relating to departing airplane, en route airplane, arrived airplane, log book, and airplane monitoring.

An in-flight services business function also relates to flight operations and includes, for example, flight attendant bidding processes, brief flight attendant, prepare for departure, fly the flight, manage in flight services, and train flight attendants. A related business function, pilots, includes for example, pilot bidding, brief pilot, prepare for departure, fly the flight, and train pilot business sub-functions. A flight operations administration business functions includes sub-functions relating to flight standards and engineering, flight operations regulatory activities, flight operations administration, fuel management, crew planning, flight operations training, and flight operations systems.

The flight operations business functions, as described above, specifically, airline operational control, airplane, in flight services, pilots, and flight operations administration all share common information. In addition, the flight operations function shares information with airline governance, external relationships, customer services and maintenance operations. For example, airline operational control, which is a part of the flight operations function, also interacts with an operational data external function by receiving weather, NOTAMS, maps, charts and movement information via data and paper. Airline operational control further interacts with air traffic control by providing requests for permissions and receiving permissions via data and voice, and marketing and planning (part of airline governance) by receiving the (daily/weekly) schedule via data and paper.

A dispatch and operations control function, which is a part of the airline operational control function, also interacts with the external functions, for example, a station operational control external function (a part of customer service) by providing dispatch release and flight plan package, and receiving flight status updates and requests for exceptions via phone and data. Similarly, a control daily maintenance operation function, which is a part of the maintenance operational control function, provides flight and aircraft status, and exceptions via voice, paper and data. A manage system operations business function, which is a part of the airline operational control function, interacts with station operational control external function (a part of customer service) by providing and receiving flight status updates via voice and data. An in flight services business function, which is a part of the flight operations function, also interacts with a catering function, which is a part of an external relationships function, by providing omissions and exceptions, and receiving equipment and instructions via voice, data and paper.

Customer Service

One facet of the enabled aircraft dispatch product includes customer service, which, in one example embodiment, includes business functions including, but not limited to, station operational control, reservations, cargo services, counter agent, ramp services, gate agent, cabin servicing, ground support equipment, and station administration.

In a specific embodiment, the station operational control business function includes business sub-functions relating to one or more of: brief station operations agent, work inbound flight, work outbound flight, perform weight and balance, depart outbound flight, plan next day operation, and training of station operations agents. An embodiment of the reservations business function includes business sub-functions relating to the briefing of reservations staff, reservations administration, providing of reservations and information, support of irregular operations, customer service systems, and training of reservations staff.

In a specific embodiment, the cargo services business function includes business sub-functions relating to one or more of: briefings relating to cargo services, departing cargo, arriving cargo, and training of cargo services personnel. A counter agent business function, in an embodiment, includes business sub-functions relating to one or more of briefing of counter agents, checking in passengers, customer sales, lost and found, and training of counter agents. A ramp services business function, in an embodiment, includes business sub-functions relating to one or more of briefing of ramp services staff, arriving flights, bag make-up, loading for flight, departing of flight, and training of ramp services agents.

An embodiment of a gate agent business function includes briefing of gate agents, meeting of inbound flight, managing passenger load, depart outbound flight, and training of gate agent business sub-functions. A cabin servicing business function, in one embodiment, includes briefing of cabin services, service arriving flight, service departing flight, and train cabin services. A ground support equipment business function, in one embodiment, includes ground support equipment planning, providing of ground support equipment, maintenance of ground equipment, and management of ground equipment. In addition, a station administration business function, includes, but is not limited to, one or more of the following business sub-functions: briefing of station administration staff, planning of station staffing, planning of station equipment use, planning of station facilities use, station administration, and station administration training.

Within the customer service function, station operational control, reservations, cargo services, counter agents, ramp services, gate agent, cabin servicing, ground support equipment and station administration all share common information. For example, the customer service function shares information with airline governance, external relationships, and maintenance operations, and flight operations as described below.

In a particular embodiment, the station operational control portion of the customer service business function interacts with external functions relating to: marketing and planning (which is a part of airline governance) by receiving the (daily/weekly) schedule via paper and data, airport authorities (which is a part of external relationships) by providing garbage and sewage servicing, and receiving baggage counts via paper and data, and fueling (which is a part of external relationships) by providing requests and receiving delivery receipt via paper and data. The station operational control portion of the customer service business function interacts with additional external functions relating to catering (which is a part of external relationships) by providing exceptions and receiving advisories via paper, data and phone, dispatch operational control (which is a part of airline operational control) by providing flight status updates and requests for exceptions, and receiving dispatch release and flight plan packages via voice and data, manage system operation (which is a part of airline operational control) by providing and receiving flight status updates via voice and data, control daily maintenance operations (which is a part of maintenance operational control) by providing exceptions and receiving flight and aircraft status, and exceptions via voice, paper and data, and perform line maintenance work (which is a part of line maintenance) by providing and receiving flight status via voice.

Maintenance Operations

Another facet of the enabled aircraft dispatch product includes maintenance operations, which, in one example embodiment, includes business functions including, but not limited to, maintenance operational control, line and layover planning, line maintenance, layover maintenance, base maintenance planning, base maintenance, component maintenance, and power plant maintenance.

In a specific embodiment, maintenance operational control business function includes the following business sub-functions: control daily maintenance operations, airplane defect control, maintenance operations control crisis management, maintenance operations control qualification training, and maintenance operations control administration and oversight. The line and layover planning business function includes the following business sub-functions: forecast requirements, daily work packages, daily work plan, post check review, qualification training, and administration and oversight.

A line maintenance business function includes the following business sub-functions: production plan, prepare for airplane arrival, line maintenance work, defer line maintenance airplane discrepancy, return line maintenance airplane to service, work package feedback, respond to airplane departure discrepancy, qualification training, administration and oversight. A layover maintenance business function includes the following business sub-functions: production plan, assign layover resources to production plan, perform layover work, defer layover airplane discrepancy, return layover airplane to service, layover work package feedback, qualification training, and administration and oversight. A base maintenance planning business function includes the following business sub-functions: forecast requirements, develop work package, post check review, planning qualification training, and planning administration and oversight.

A base maintenance business function includes the following business sub-functions: production plan, check management, perform base maintenance work, defer base maintenance airplane discrepancy, return base maintenance airplane to service, base maintenance work package feedback, qualification training, and administration and oversight. A component maintenance business function includes the following business sub-functions: shop planning, shop work progress, component maintenance release, qualification training, and administration and oversight. A power plant maintenance business function includes the following business sub-functions: shop workload and priorities, power plant work in progress, maintenance qualification training, and administration and oversight.

Within the airline maintenance operations function, maintenance operational control, line and layover planning, line maintenance, layover maintenance, base maintenance planning, base maintenance, component maintenance, and power plant maintenance all share common information. For example, the airline maintenance operations function shares information with airline governance, customer services and flight operations, as described below, specifically, the perform line maintenance work (part of the line maintenance function) also interacts with the following external functions: material services (part of airline governance) by providing used parts and shipping notices, and receiving parts and shipping notices via paper, and station operations control (part of customer service) by providing and receiving flight status via voice.

The control daily maintenance operations (part of maintenance operational control) also interacts with the following external functions: material services (part of airline governance) by providing part enquiry and receiving part availability via voice and data, station operations control (part of customer service) by providing flight and aircraft status, and exceptions, and receiving exceptions via voice, and dispatch operations and control (part of airline operational control) by providing flight and aircraft status, and exceptions, and receiving exceptions via voice.

Airline Governance

Another facet of the enabled aircraft dispatch product includes airline governance, which, in one example embodiment, includes business functions including, but not limited to, marketing and planning and material services.

In a specific embodiment, the marketing and planning business function includes the following business sub-functions: develop the marketing plan, major season schedule planning, implement the market plan, monthly schedule preparation, analyze market performance, manage the market plan, develop new or enhanced products, loyalty program management, implement new or enhanced products, marketing administration, and marketing training. In another specific embodiment, the material services business function includes the following business sub-functions: materials planning, control inventory, procure material and services, warehousing logistics, critical material services, qualification and training, and administration and oversight.

External Relationships

Another facet of the enabled aircraft dispatch product includes external relationships, which, in one example embodiment, includes business functions including, but not limited to, is composed of the following business functions: air traffic control, operations data, fueling, and airport authorities. The air traffic control business function includes business sub-functions relating to one or more of central flow control, en route traffic control, arrival and departure control, tower control, ground control, and clearance delivery. The operations data business function includes business sub-functions relating to one or more of weather and NOTAMS, maps and charts, and flight management data. The fueling business function includes business sub-functions relating to one or more of fueling management, overnight fueling, departure fueling, and fueling training. The airport authorities business function includes a baggage service infrastructure business sub-functions.

A situational awareness system, or tool, tool is configured, and has a technical effect such that it may gather and present data that is relevant to the decision maker's goals. The system has business rules that define a respective user's goals which gathers and presents data in such a manner that allows the user assess how they are performing against those goals. As part of the data gathering process, the situational awareness tool extracts critical data from networked systems and transmits the data to a medium where the user can begin interpreting such data. The situational awareness system includes data analysis and processing to provide an understanding as to the criticality of the information being captured and stored, based on business rules and a user profile, which controls the select data being captured, stored and presented to the user. The data analysis processing provides the understanding of the criticality of the information. For example, some information may not be relevant for present decisions, but may have significance relevance for future events. For example, a slightly elevated aircraft engine exhaust temperature may not affect any current operational decisions, but it may have an affect on maintenance scheduling. As another example, a flight that is fifteen minutes late arriving to a terminal may not affect aircraft operational decisions, but it may have an affect on fueling truck and other maintenance operations.

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (a) as a sequence of computer implemented steps running on a computing system and/or (b) as interconnected hardware and software modules within the computing system. The implementation is a matter of choice dependent on the requirements of the computing system implementing the embodiment. Accordingly, the logical operations making up the embodiments described herein are referred to alternatively as operations, steps or modules.

FIG. 1 illustrates an exemplary system 100 for automated collection, processing and presentation of situational awareness information concerning events and the general status of circumstances surrounding an aircraft according to one embodiment. In this embodiment, the system 100 includes a first aviation enterprise system 110, a second aviation enterprise system 120, a decision support system 106, integration broker system 130, dashboard interface system 108, user interface workstation 140 and a mobile user interface device 142. Aviation enterprise systems are individual systems that monitor, for instance, air traffic or maintenance plans, or other aspects of airline operation as described above. The embodiment of system 100 illustrated in FIG. 1 shows only two aviation enterprise systems, a first aviation enterprise system 110 and a second aviation enterprise system 120. For purposes of this example, the first aviation enterprise system 110 is an air traffic enterprise system and the second aviation enterprise system 120 is a maintenance plan enterprise system.

While FIG. 1 shows only two aviation enterprise systems, it is to be understood that the embodiment illustrated in FIG. 1 may be configured to include more than two aviation enterprise systems, each of which is connected to the integration broker system 130 and associated with an aspect of airline operation as described above. Each aviation enterprise system may include a processor, a viewing device, business logic, and data storage. As illustrated, first aviation enterprise system 110 includes a processing capability that results in, a view 112, business logic 114, and data storage 116. The second aviation enterprise system 120 also includes a processing capability that results in, a view 122, business logic 124, and data storage 126. In an alternative embodiment, business logic for all enterprise systems may be centrally located, for example, within integration broker system 130. In operation, the decision support system 106 is retrieving information related to situations of which various users need to be advised. In addition, the decision support system 106 may be triggered to gather additional information in response to an event.

Specifically, the decision support system 106 includes a set of data parameters that define data of which individuals need to be aware, and such data are continuously pulled from respective aviation enterprise systems. The data, which has been retrieved, is correlated in accordance with business rules. The business rules are associated with the data retrieved and based on rules defined by an entity controlling how data are interpreted. For example, the failure rate of an aircraft component and the speed with which it is repaired may differ between two airline companies based on the priority each airline places on replacement of the failed component. The priority and interpretation of an event or situation may vary from airline to airline based on business rules and the manner in which data are interpreted by the business rules.

The data is further processed in view of historical data that is retrieved by the decision support system 106, generating awareness of a situation. The decision support system 106 transmits the situational awareness data to the dashboard interface system 108 which further processes the situational awareness data in view of user profiles of the users networked to the system, presenting the situational awareness data in manner that is optimized in accordance with preferences to viewing the situational awareness data. Users of the system 100 may view the situational awareness data presented to the interface dashboard system 108 via a user interface workstation 140 or a mobile user interface device 142.

Figure 2:
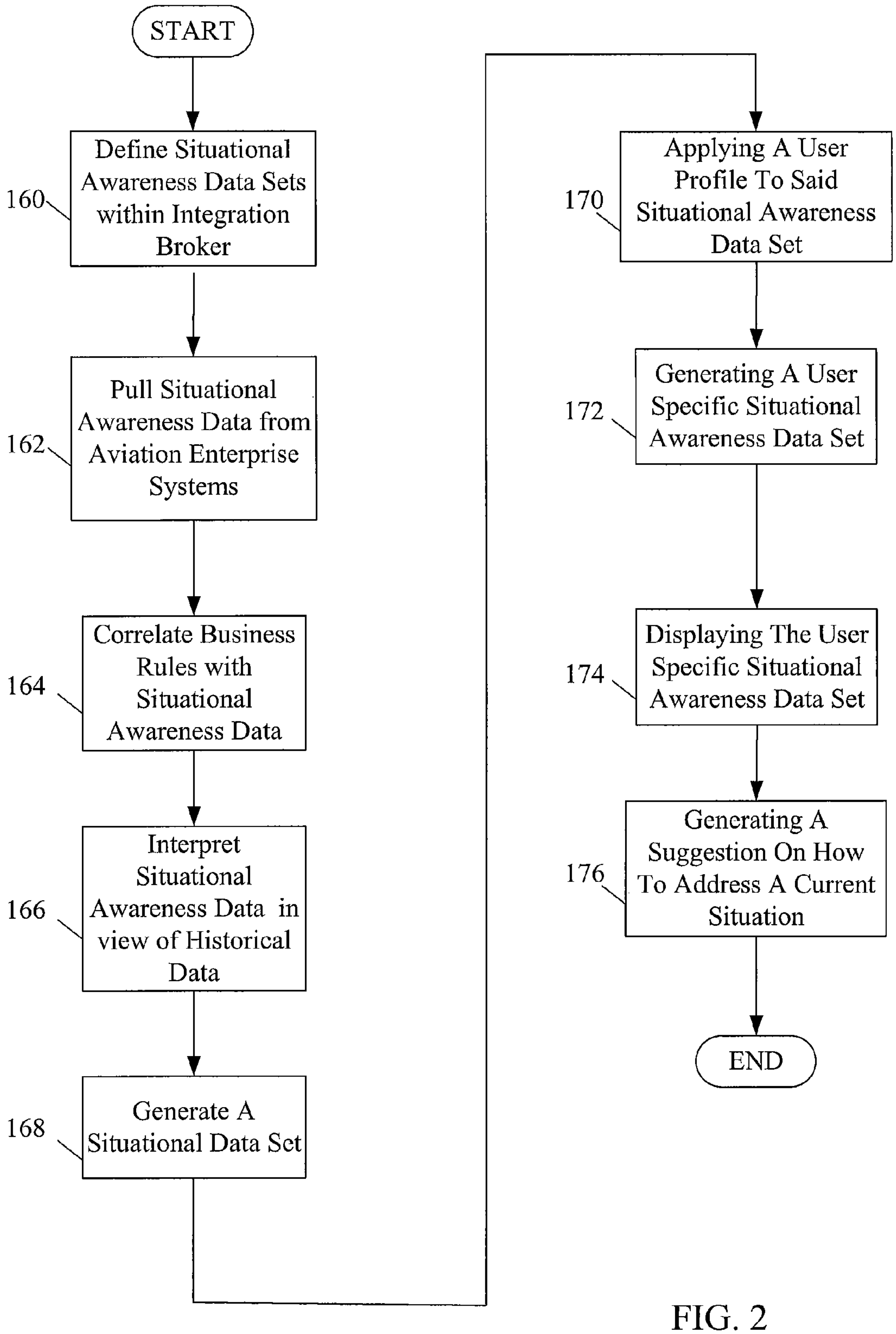
FIG. 2 is a flow diagram, illustrating one embodiment of a situational awareness process.

FIG. 2 illustrates the process of generating situational awareness data for eventual presentation to a system user. First, definitions of the situational data sets are defined 160 and stored within the integration broker system 130. The definition sets the rules for the type of data that is to be retrieved from each of the plurality of aviation enterprise systems by integration broker system 130. In accordance with the definition 160 of the situational awareness data, the decision support system 106 retrieves 162 data sets from each of the plurality of aviation enterprise systems 110 and 120 through the integration broker 130 and stores the data. Next, the decision support system 106 retrieves business rules that are associated with the situational data that has been retrieved from the plurality of aviation enterprise systems and correlates 164 the situational data in accordance with the business rules. Next, the decision support system 106 interprets 166 the correlated 164 situational data in view of historical data. Next, the decision support system 106 generates 168 integrated situational awareness data that combines the information retrieved and transmits the situational awareness data to the dashboard interface system 108 through the integration broker 130. The dashboard interface system includes user interface profiles that are applied 170 to the situational awareness data in order to generate 172 user specific situational awareness data. The dashboard interface system displays 174 the user specific situational awareness data to a respective user through user interface devices, such as a user interface workstation 140, including generating 176 one or suggestions on how to address current situations.

An aspect of the present invention is the ability to integrate information from a plurality of independent aviation enterprise systems and present the information to a system user in a manner dependent on who the user is and preferences previously defined for the user. For example, aircraft maintenance has a plurality of enterprise systems and flight operations has a plurality of enterprise systems each having its own information and related systems. While these sets of systems have related information, in the past the information was not joined together and presented to the user in a manageable arrangement for utilization. The user was required to review information from two or more systems separately and correlate the information on their own. If a maintenance operations schedule were integrated with a flight operations schedule, an overall awareness of availability of aircraft for scheduled maintenance, and availability of maintenance facilities and materiel for unscheduled aircraft maintenance needs would be achieved. In this example, the decision support system 106 integrates the scheduling portion of maintenance operations and flight operations (schedules) associated with specific airports at which a respective plane having a maintenance problem may be landing and present the results in real time. Other aviation enterprise systems that may be integrated with maintenance and flight scheduling systems may include, but are not limited to, maintenance crew scheduling system, weather systems, air traffic control systems, systems maintaining data related to aircraft structural repairs, and systems containing documents regarding an aircraft's air worthiness.

The situational awareness system of the present invention takes all of this data and merges it, thereby performing at least one object of the present invention, specifically, gathering and presenting data that was presented separately in the past. The situational awareness system presents the data in an integrated way, presenting different views of the data associated with a situation, for example, related to aircraft departure, depending upon a respective user's profile. The present invention synthesizes the data by filtering the information and presenting the information that is the most important, or relevant, to an individual user. The information is presented in such a way that the data advises the respective user of a situation, thereby allowing the user to efficiently assess the situation and its potential impacts.

Figure 3:
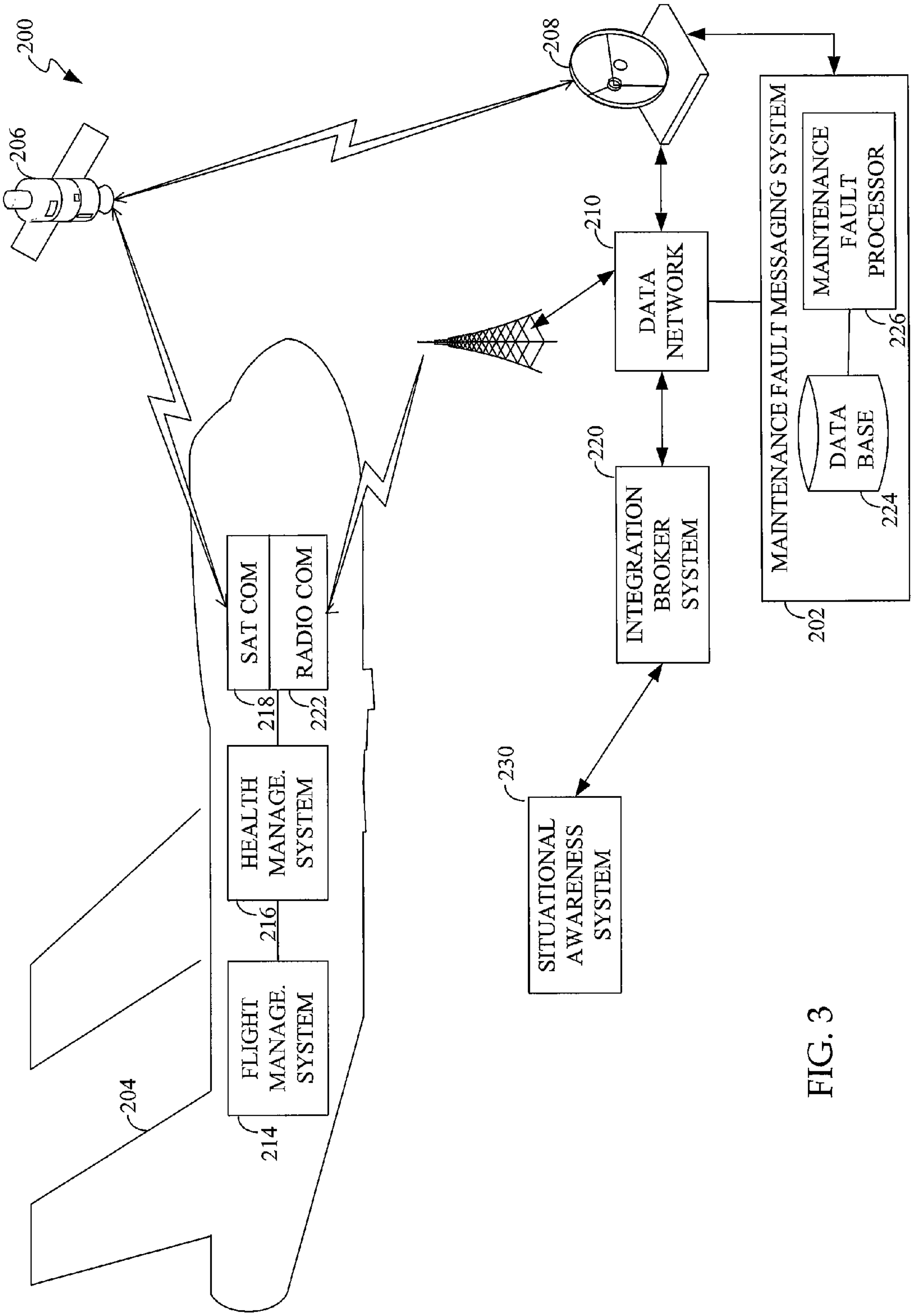
FIG. 3 is a diagram illustrating components of a situational awareness system utilized in aircraft flight and maintenance.

FIG. 3 illustrates an exemplary system 200 in which a situational awareness system is integrated with one aviation enterprise system 202 (maintenance fault messaging system) and an aircraft 204, which may be in flight. As illustrated, the system 200 is configured for automated collection and transmission of information concerning health of the aircraft from the aircraft 204, to situational awareness system 230. Data concerning aircraft health is transmitted from the aircraft 204 to the aviation enterprise system (maintenance fault messaging system) 202 that transmits the data to an integration broker system 220 upon request of the data by the integration broker system 220. While FIG. 3 illustrates the communication of the situational awareness system 230 and the integration broker system 220 with only one aviation enterprise system (maintenance fault messaging system 202), it is to be understood that situational awareness system 230 may be integrated with a plurality of other aviation enterprise systems. The aviation enterprise systems which are accessed, such as the maintenance fault messaging system 202, for transmission of data to the integration broker system 220 depends on the rules with which the integration broker system 220 are programmed.

As illustrated, system 200 includes an aircraft 204, an aviation enterprise system (maintenance fault messaging system 202—a ground-based computer system maintained by an airline or a third party), an integration broker system 220, a situational awareness system 230, one or more satellites 206, one or more satellite communication receivers 208, a data network 210, and one or more radio communication system receivers 212 (note: the radio receivers can be those which communicate with the airplane while in flight or radios, such as 802.11 wireless, which communicate only on the ground). Further, in accordance with this embodiment, aircraft 204 includes a Flight Management System 214, aircraft health management system 216, a satellite communication unit 218 and a radio communication unit 222. Still further, in accordance with this embodiment, the aviation enterprise system 202 includes a maintenance data store 224 and a maintenance fault processor 226.

In this embodiment, Flight Management System 214 is coupled to a variety of aircraft sensors (not shown) that provide information related to the performance of the aircraft 204, and environmental conditions. For example, the sensors may provide information such as engine pressure, engine rotation speeds, global positioning system (GPS) location information, wind speed and direction, temperature, altitude and air pressure. In addition, Flight Management System 214 settings that affect the performance of the aircraft 204, including both flight settings (such as target speeds) and route settings (such as flying off-path to avoid weather), may form part of the collected information. Flight Management System 214 includes interfaces to receive the output signals from the sensors, including analog-to-digital converters for handling analog sensor signals. In addition to the Flight Management System 214 the aircraft also includes an Aircraft Health Management System 216 that is used to monitor the aircraft's condition. The Aircraft Health Management System 216 is coupled to a variety of aircraft sensors (not shown) that provide information related to the health of equipment on the aircraft such as the engines or a device such as the integration drive generator. The integration broker system 220 retrieves data from the maintenance fault messaging system 202 through the data network 210. The integration broker system 220 also retrieves data from and transmits data to the situational awareness system 230 in processing and generating user specific situational awareness data.

By way of example, if an aircraft's Integrated Drive Generator fails, the health management system 216 recognizes the event and transmits a message to the pilot and to the maintenance fault messaging system 202. The message may be transmitted via satellite communication unit 218 to a satellite 206, then to a satellite communication receiver 208. Next, the message is transmitted through the data network 210 to the maintenance fault messaging system 202. The message may also be transmitted via the aircraft's radio communication unit 222 to a radio communication system receiver through the data network 210 to the maintenance fault messaging system 202. The maintenance fault messaging system 202 receives and interprets the message and defines the situation. The situational awareness system 230 retrieves data regarding the fault message and the defined situation and processes the information by way of correlating the message and the defined situation with business rules associated with the defined problem and situation. The data regarding the fault message and the defined situation is further processed in view of historical data regarding previous situations of a similar type and fault messages of a similar nature in order to place the situation and the event that caused the situation into context. The situational awareness system also determines the documents necessary to support repair or replacement of an Integrated Drive Generator and facilitates the transmission of electronic copies of such documents to appropriate maintenance personnel or that hard copies of the required documents are retrieved and made available to the appropriate maintenance personnel.

One method in which the situational awareness system 230 responds to an event, such as the failure of an aircraft's Integrated Drive Generator is to gather information from the perspective of, there is a situation, and how should it be responded to. In answering the question, the situational awareness system 230 gathers information from a plurality of aviation enterprise systems. For example, if the plane is flying to Paris and the aircraft's Integrated Drive Generator fails, the situational awareness system will retrieve data from a plurality of aviation enterprise systems, including the maintenance fault messaging system 202 and answer the question of whether the maintenance station at the Paris Airport has the resources (equipment, personnel) to handle the failure of an aircraft's Integrated Drive Generator. Situational awareness will also automatically determine whether the aircraft can continue on its flight path in view of the aircraft's failed Integrated Drive Generator. The situational awareness system will also automatically assess whether the aircraft needs to be diverted to another airport for repair at a strategic location having the resources to handle the failure, or whether the aircraft has to be diverted and landed immediately due to the hazards created by the aircraft's failed Integrated Drive Generator. The situational awareness system also determines, whether the airport to which the aircraft may be diverted has the skills, resources, people, parts and anything else that is necessary to fix the failed Integrated Drive Generator.

The situational awareness system can make these determinations based on information retrieved from the plurality of aviation enterprise systems to which it is networked. An important aviation enterprise system from which the situational awareness system must retrieve data in order to create optimal situational awareness is the system that includes the (extended twin-engine operations) ETOPS restrictions. ETOPS restrictions are procedures and regulations that govern how to deal with the failure of equipment on an aircraft. Some equipment failures are critical, requiring an immediate diversion and landing of an aircraft, and others are not critical. Within these non-critical equipment failures, some may require that restrictions be placed on aircraft usage (limits placed on distance aircraft may fly, limit aircraft to flights over land, etc.) and allow the repair of the equipment to be deferred. The situational awareness system retrieves data from the aviation enterprise system that includes ETOPS restrictions and correlates the data concerning the failure of such aircraft equipment regarding the failure of aircraft equipment with the regulatory data retrieved from the aviation enterprise system that includes ETOPS restrictions and correlates the data and presents the information to the user and advises on a course of action. A system user has the option of accepting proposed suggestion(s). If the suggestion relates to a failed part such as the Integrated Drive Generator, the user may be provided an option to defer fixing the failed part, or advising the user that the part requires immediate repair.

Figure 4:
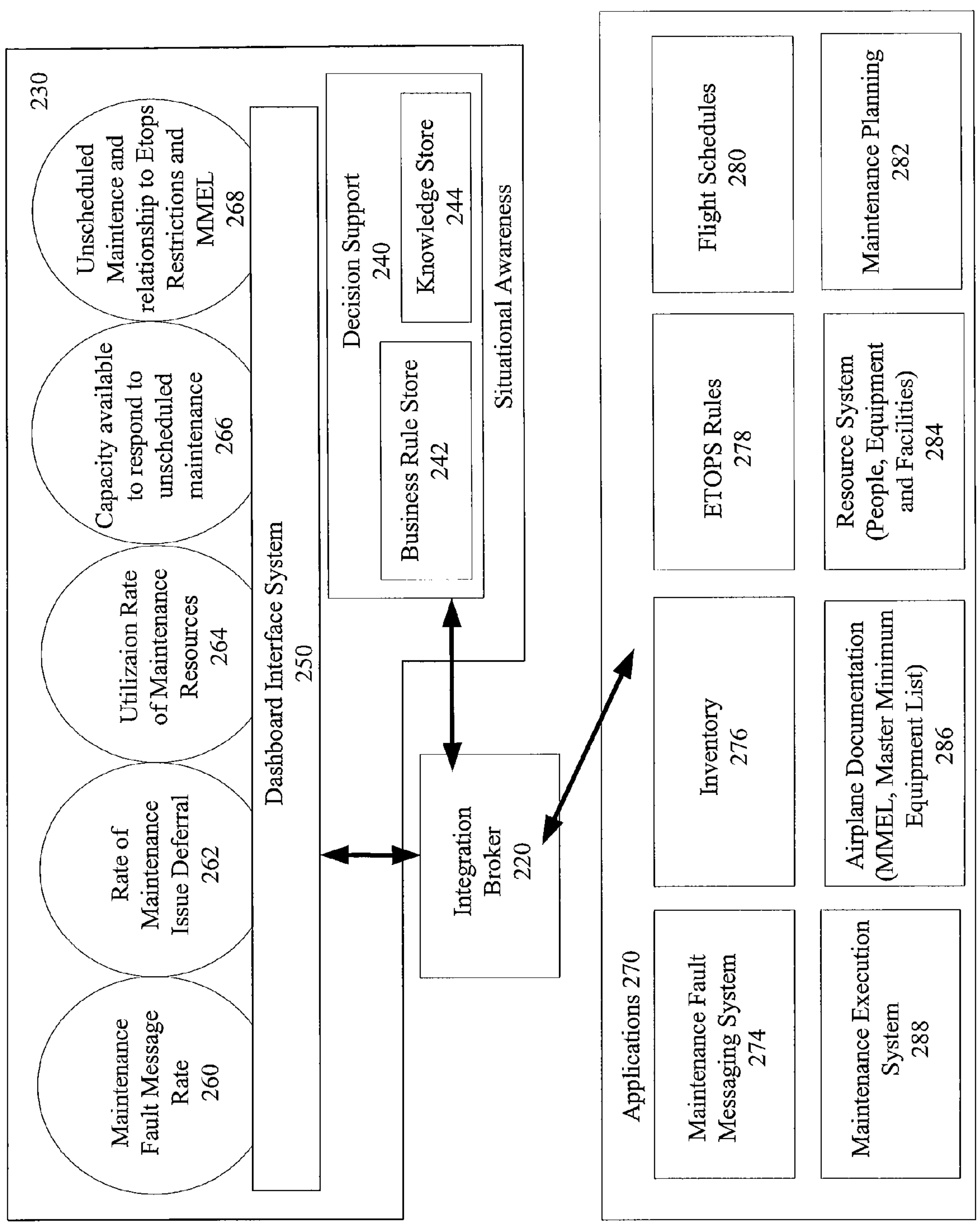
FIG. 4 is a diagram illustrating example processes that might be utilized in a situational awareness system.

FIG. 4 illustrates an exemplary system 250 for automated collection, processing and presentation of situational awareness information concerning events and the general status of circumstances surrounding an aircraft and supporting agencies and facilities according to one embodiment. In the embodiment illustrated, the system 250 includes a plurality of aviation enterprise systems 270, including but not limited to a Maintenance Fault Messaging System 202 (also shown in FIG. 3), an Inventory System 276, an aviation enterprise system 278 that includes the ETOPS restrictions, a Flight Schedules system 280, a Maintenance Planning system 282, an aviation enterprise system 284 that manages resources (people, tools, equipment, and facilities including schedules and operating limits), an aviation enterprise system 286 that includes the Aircraft Documentation and a Master Minimum Equipment List (MMEL) and a Maintenance Execution system 288 where maintenance records are stored and which houses information concerning maintenance tasks which have been deferred and logged within a maintenance queue.

Maintenance Planning system 282 hosts airplane maintenance schedules which are based, at least in part on manufacturers recommendations. Flight Scheduling system 280 is used and to store the flight schedules for aircraft within a fleet. Not shown is a Maintenance Documentation system that includes maintenance documentation that provides limits in which an airplane can operate. The Maintenance Fault Messaging system 202 receives maintenance faults that are transmitted from the systems onboard the aircraft down to the ground. A system that is capable of storing these maintenance faults is referred to as a filing a cabinet or as a computing system. Additionally, a Vehicle Health management system (not shown) is configured to monitor aircraft systems and produce status messages that can be consumed by Maintenance Fault Messaging system 202 and other on board applications.

System 250 further includes a decision support system 240, an integration broker system 220 and a dashboard interface system 252. The decision support system 240 includes a business rules store module 242 and a knowledge store module 244. The user interface workstation (not shown) and the mobile user interface device (not shown) are networked to the dashboard interface system 252. Integration broker system 220, in one embodiment, is configured to provide a conduit through which situational awareness requests/retrievals are passed.

Referring back to the example of the failure of an aircraft's Integrated Drive Generator, the situational awareness system 230 receives data from a plurality of aviation enterprise systems 270, including the maintenance fault messaging system 202. The integration broker system 220 retrieves data from the maintenance fault messaging system 202 regarding the aircraft's failed Integrated Drive Generator and also retrieves data from other aviation enterprise systems 270. The integration broker system 220 retrieves data from the Inventory System 276 to determine if there are replacement parts or a replacement Integrated Drive Generator available for use in repair of the failed Integrated Drive Generator at the appropriate landing site. The appropriate landing sight is influenced by the data the integration broker system 220 retrieves from the aviation enterprise system 278 that includes the ETOPS restrictions, which include FAA restrictions, rules and regulations on planes with failed components.

To the extent the equipment failures are defined as critical, requiring an immediate diversion of the flight plan and landing of the aircraft, the pilot as well as all other necessary personnel on the network shall be advised of the recommendation to land the aircraft along with any other pertinent situational awareness data. If the equipment failure is defined as a non-critical failure, some restrictions may be placed on aircraft usage, such as a limit on the distance the aircraft may fly. If the failure does not require immediate landing, there may be a landing sight more suitable to repairing the failed equipment, specifically, a sight that is within the allowed flight distance for an aircraft which such an equipment failure, and that has the appropriate repair parts for the failed equipment or a replacement for the failed equipment. The appropriate landing sight may also be the flight destination, because it is within the allowed flight distance, regardless of whether it has the replacement parts or a replacement for the failed equipment, for example, the above described integrated drive generator.

The integration broker system 220 also retrieves data from the Flight Schedules system 280. If the failed Integrated Drive Generator is deemed not critical and the aircraft may continue to fly and does not require immediate diversion, then the flight schedule data at each potential landing sight may be assessed to determine if the plane may be diverted to another airport. The integration broker would also be assessing the flight schedules of all aircraft at the possible flight destinations for a plane swap, so that the plane may be fixed immediately. Whether the plane may be fixed immediately or at some point in the future is dependent upon the possibility of whether the repair of the equipment may be deferred and the maintenance planning data, resource data concerning availability of maintenance personnel, equipment data and facilities data retrieved from the maintenance planning system 282, the maintenance execution system 288 and the resource system 284. It is possible that the proposed repair does not fit into the repair schedule based on the maintenance plan. If that is the case, and the failure is not critical, the flight may be allowed to proceed as planned.

The integration broker system 220 retrieves and processes data related to the defined situation. Within processing of the data, the integration broker system 220 correlates the message and the defined situation with business rules retrieved from the business rules store 242 within the decision support system 242. The correlated data is further processed in view of historical data retrieved from a knowledge store 244 within decision support system 240. The situational awareness system also determines the documents necessary to support repair or replacement of an Integrated Drive Generator. The integration broker system 220 retrieves data from the aviation enterprise system 286 that includes Airplane Documentation, including the Master Minimum Equipment List (MMEL). The situational awareness system also facilitates the transmission of electronic copies of such documents to appropriate maintenance personnel or that hard copies of the required documents are retrieved and made available to the appropriate maintenance personnel. The integration broker system 220 also retrieves data from the knowledge store 244, which includes historical data on events such as a failed Integrated Drive Generator. The historical data includes data concerning the time it took to repair an Integrated Drive Generator in the past. This data allows the integration broker system 220 to further assess and determine the possible locations at which a failed part, such as the Integrated Drive Generator, may be fixed.

Within the situational awareness system 230, the dashboard interface 252 facilitates the presentation of data to respective system users. The dashboard interface includes a processor that filters data within the situational awareness data based on the profile of a user networked to the system. A system user has a profile stored on the dashboard interface system 252 that controls filtering of situational awareness data that a system user is to be presented. The profile of a respective user determines the data presented to the user concerning situational awareness. In the embodiment illustrated in FIG. 4, the dashboard 252 illustrates five views concerning the failure of the Integrated Drive Generator. In the first view 260, the dashboard interface system 252 illustrates data representative of the maintenance fault message rate. In the second view 262, the dashboard interface system 252 illustrates data representative of the rate of maintenance issue deferral. In the third view 264, the dashboard interface system 252 illustrates data representative of the utilization rate of maintenance resources 264. In the fourth view 266, the dashboard interface system 252 illustrates data representative of the capacity available to respond to unscheduled maintenance. In the fifth view 268, the dashboard interface system 252 illustrates data representative of the unscheduled maintenance and relationship to ETOPS restrictions and MMEL.

Figure 5:
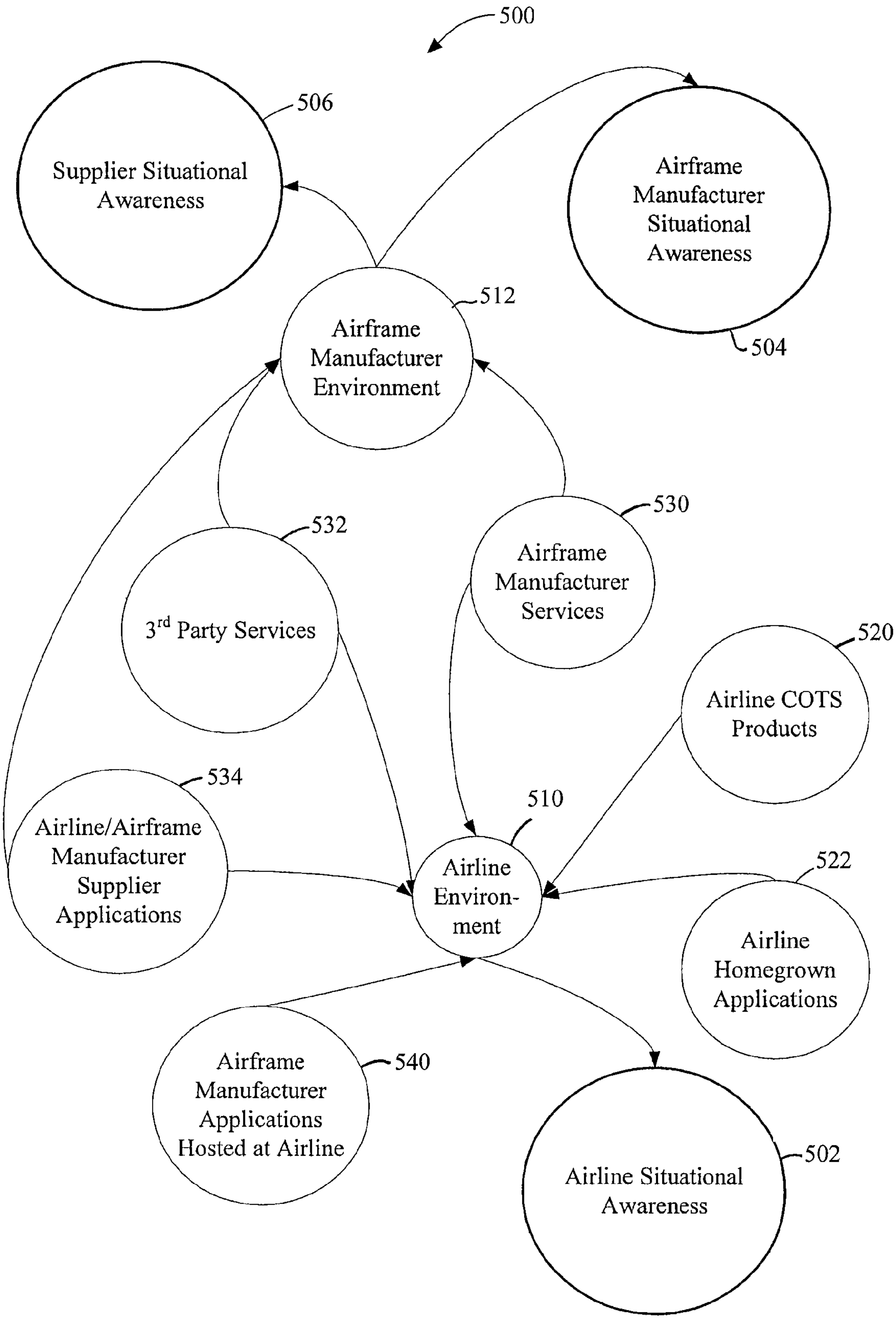
FIG. 5 is a diagram illustrating contexts of a specific situational awareness enterprise.

FIG. 5 is a diagram 500 that illustrates situational awareness in the context of an airline operator 502, an airframe manufacturer 504, and a parts supplier 506 as related to an airline environment 510 and an airframe manufacturer environment 512. Providing input into the airline environment are airline specific applications including airline commercial-off-the-shelf (COTS) products 520 and airline produced (e.g., homegrown) applications 522. Applications provided by the airframe manufacturer (e.g., airframe manufacturer services 530) provide input into both environments 510 and 512 as do third party services 532 (e.g., independent airport service providers) and joint applications 534. A manufacturer application 540 may be provided by an airframe manufacturer to provide input into only the airline environment 510.

Figure 6:
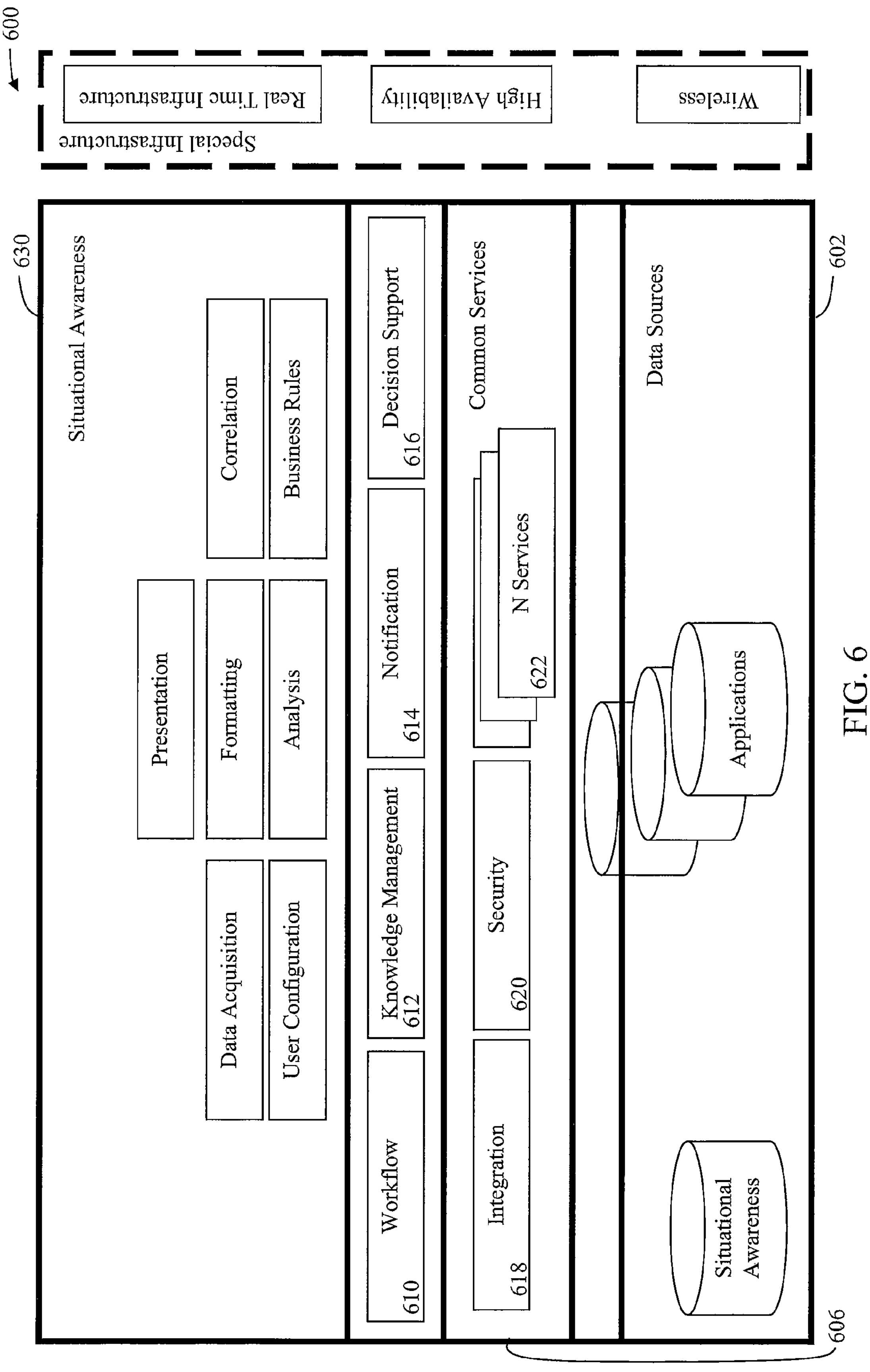
FIG. 6 is a block diagram illustrating a hierarchy of data that is maintained within one embodiment of a situational awareness system.

The Situational Awareness tools and methods for operating the tool described herein provide standards and instrumentation necessary, for example, to run an airline. FIG. 6 is a block diagram 600 illustrating a hierarchy of data that is maintained within one embodiment of a situational awareness tool. Specifically, data sources 602 include data from a plurality of applications 604, at least some of which have been generally described above with respect to FIG. 5. Common services 606 that are utilized in providing users with information that allows for informed decision making include, but are not limited to, workflow management 610, knowledge management 612, notifications 614, decision support 616, integration 618, security 620, and other services 622. In providing the user a presentation of situational awareness 630, applicable tools may include presentation 632, data acquisition 634, formatting 636, correlation 638, user configuration 640, analysis, 642, and business rules 644.

The above described situational awareness tools have the technical effect of helping users in defining the instrumentation, understanding the inputs, and interpreting and processing the inputs for the instrumentation that presents situational awareness information to groups of users. The tools are developed, for example, with business rules in mind. The instrumentation in the situational awareness tools is dynamic such that there is more than an indication that something is wrong. Rather, the situational awareness tools and systems (for example system 100 of FIG. 1) are able to indicate that the operation, for example, the running of an airline, is moving in the wrong or right direction, at what speed is it moving in that direction. More specifically and continuing with the airline operation example, operators need to know when they are slowly deviating from the plan and how fast they are moving in this direction, with respect to aircraft scheduling and availability, maintenance, airport backlog, personnel, etc.

The backbone to the instrumentation of the situational awareness tool of FIG. 6 are the algorithms processing the data from the various contributing enterprise systems, examples of which are described specifically with respect to FIG. 4 and generally with respect to FIG. 5. As the situational awareness system evolves, algorithms will assess the current situation and transform the data for the user to easily interpret. One category of algorithm process real time information to give the user the best understanding of his current environment. Another category of algorithms advise the user of the various options that meet business rule criteria.

As the real time information is processed, users are provided with a real time perspective of the operations according to their function. Algorithms running in the background filter out the superfluous data that typically confuse an operator and presents the information in formats that user can digest. This means that goals such as enabling easier decision making by packaging options together for the user, enabling users to efficiently assess operational realities to empower fact driven decisions by tailoring specific role based rules, providing a consistent shared view across all users into the operational situation, and being an entry point into a suite of E-enabling products is met.

Additionally the situational awareness tool, and the methods associated therewith, allow business objectives to be met including differentiation of the integrated solution from competitors solutions, improvement of the e-Enable environment user experience, customer driven requirements, technical objectives, delivering situational awareness to devices with access to a network, and leveraging the e-Enabled reference architecture approach in the design and implementation further providing a scaleable solution that allows the addition of different modules.

One of the services listed with respect to FIG. 6 includes notification services 614 which is a service which will notify the user of situational awareness system alerts. Examples for the use of notification services 614 may include that a business rule has been violated or that a business rule has been met and communication is needed. Notification services 614 further provide a capability of emailing one or more users, providing SMS/MMS messages to a user's cell phone/mobile device, delivery of messages to applications for processing, and a setting of the priority of the message.

Notification services 614 also provides the capability to route and deliver messages to the right users. Applications are executed based on business rules. If the business rule (outside the application) requires notification the workflow system will construct a message and send to the integration broker to be routed to the appropriate users.

With respect to workflow services 610, the defining of business process rules for the situational awareness is critical for many of the various components of the situational awareness system. Once these business process rules are defined, the other components will be dependent on the workflow system. In the integrated environment of the situational awareness system, having different terminology from different application for executing the same process likely results in customer confusion and redundancy.

Figure 7:
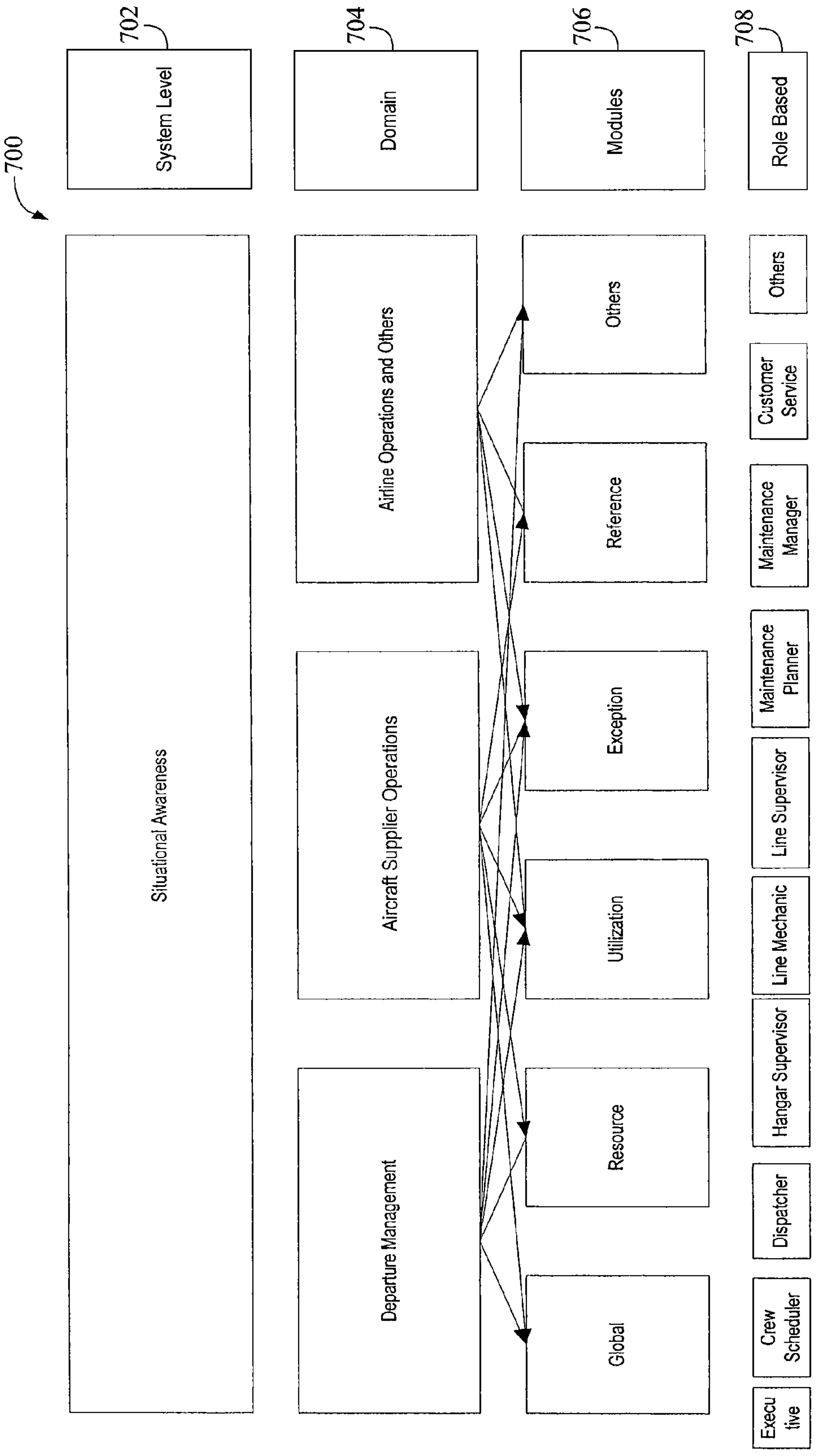
FIG. 7 is a role-based architecture for one embodiment of a situational awareness system.

FIG. 7 is a role based architecture 700 for one embodiment of the situational awareness system described herein. The architecture 700 includes a system level 702, a domain level 704, a module level 706 and a role based level 708. The role based level 708 includes the users that might interact with a situational awareness system, including for the airline example used herein, but not limited to, an airline executive, a crew scheduler, a dispatcher, a hangar supervisor, a line mechanic, a line supervisor, a maintenance planner, a maintenance manager, customer service, and others. Modules 706 that these users may interface to include a global operations module, a resource module, a resource utilization module, an exception module, a reference module, and other modules depending on the application of the situational awareness system. Domains 704 within the situational awareness system include, for the example airline application, departure management, aircraft supplier operations, and airline operations.

Figure 8:
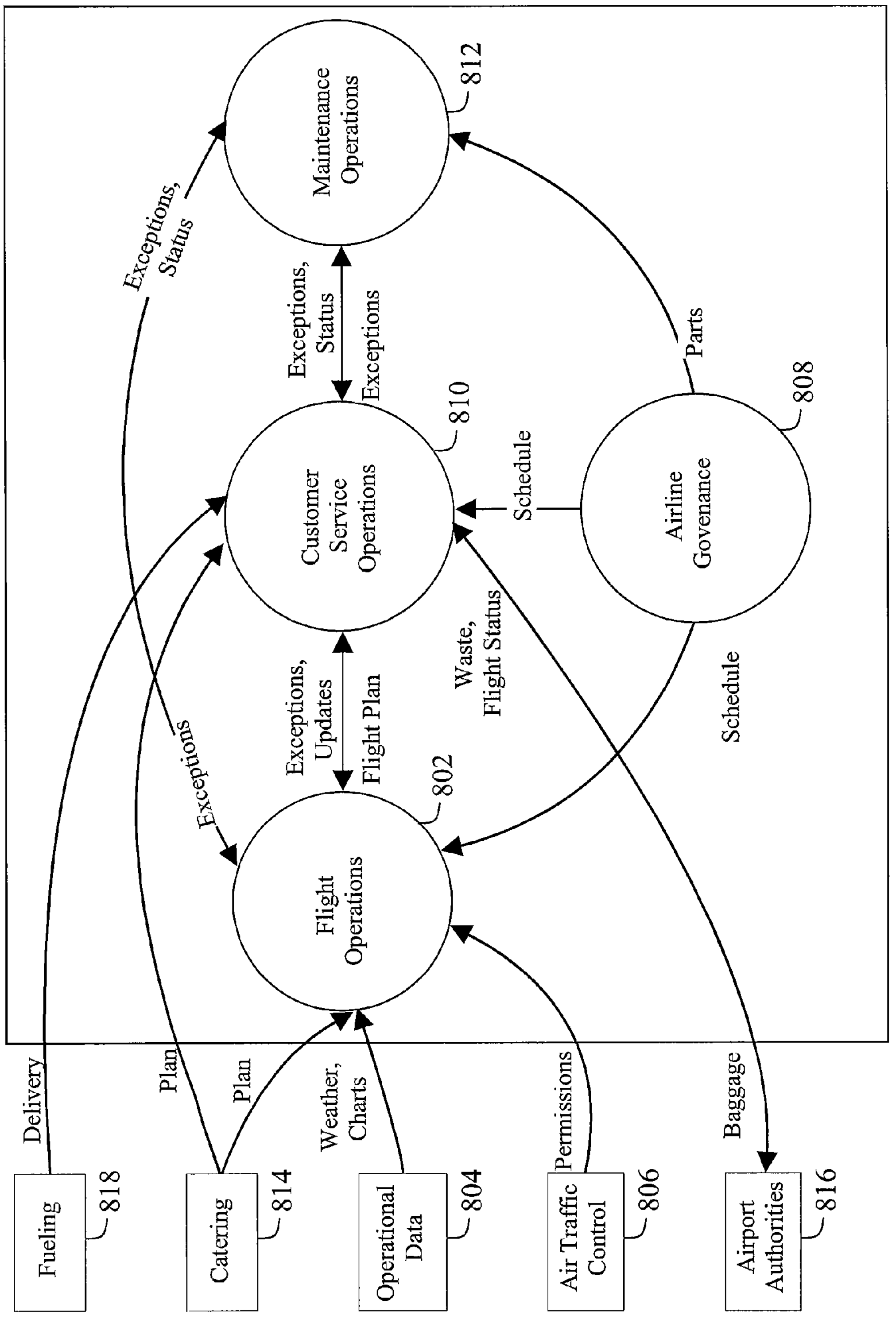
FIG. 8 is a flow diagram including notional representations of macro processes, information interactions, and high level information flows within an aviation process model.

FIG. 8 is a flow diagram 800 including notional representations of macro processes, information interactions, and high level information flows within an aviation process model.

A flight operations macro process 802 represents the airline business of managing the daily operations of the airline enterprise in accordance with the published airline schedule, managing aircraft usage, and managing flight and cabin crew scheduling, and operations administration. In various embodiments, flight operations receives weather and charts via data and paper from operational data 804, receives permissions via data and voice from air traffic control 806, and receives the schedule via data and paper from airline governance 808.

Additionally, flight operations 802 provides flight plans to, and receives updates and exceptions via phone and data from, customer service operations 810, provides exceptions to, and receives status via voice, paper and data from, maintenance operational control 812, and receives the catering plan via voice, data and paper from catering 814.

The customer service operations macro process 810 represents the airline business of airline station (that part of the airport the airline has responsibility for) daily operations, reservations, cargo services, counter agent, ramp services, gate agent aircraft cabin servicing, ground support equipment, and station administration. In various embodiments, customer service operations 810 receives the schedule via paper and data from airline governance 808, provides garbage and sewage to, and receives baggage counts via paper and data from, airport authorities 816 (airport operations, and receives fueling delivery receipt via paper and data from fueling 818. Additionally, customer service operations 810 receives the catering plan via paper, data and phone from catering 814, provides updates and exceptions to, and receives dispatch release and flight plan packages via voice and data from, flight operations 802, and provides exceptions to, and receives aircraft status and exceptions via voice, paper and data from, maintenance operations 812.

The maintenance operations macro process 812 represents the airline business of aircraft maintenance daily operations management, component and power plant maintenance, and line, layover and base planning, and maintenance. In various embodiments, the maintenance operations macro process 812 receives parts via paper from airline governance 808, provides aircraft availability status and exceptions to, and receives exceptions via voice from, customer service operations 810, and provides aircraft status and exceptions to, and receives exceptions via voice from, flight operations 802.

The airline governance macro process 808 represents the airline business of marketing and planning, and material services. In various embodiments, the airline governance macro process 808 provides the schedule via data and paper to flight operations 802, provides the schedule via data and paper to customer service operations 810, and provides parts via paper to maintenance operations 812.

External entities are part of the airline extended enterprise, providing services essential to the operation of the airline. Examples include operational data providing weather and charts to flight operations, catering providing the catering plan to flight operations and customer service operations, fueling providing delivery to customer service operations, air traffic control providing permissions to flight operations, and airport operations receiving waste and flight status, and providing baggage to customer service operations.

Figure 9:
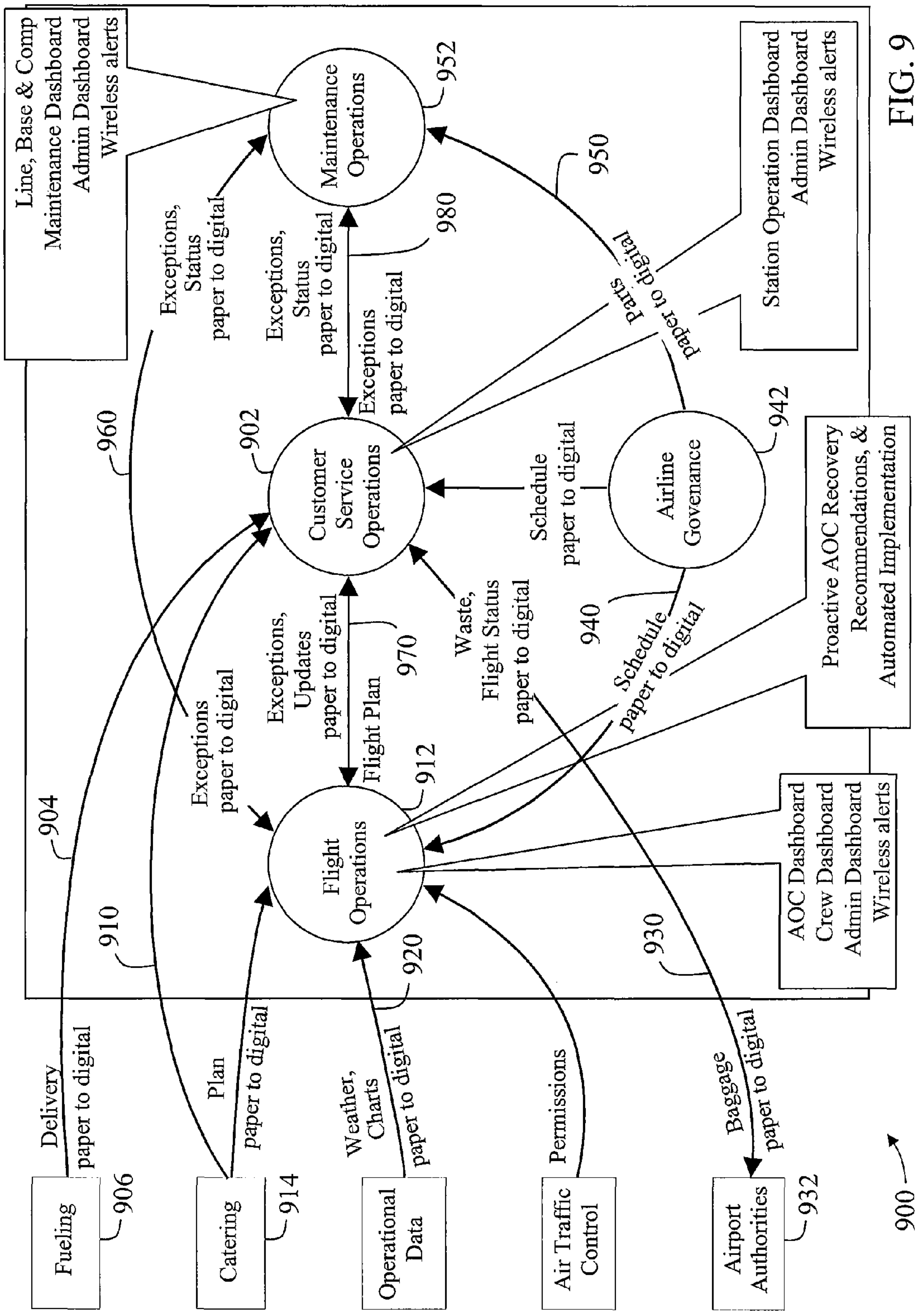
FIG. 9 is a flow diagram including notional representations of macro processes, information interactions, and high level information flows within an aviation process model.

FIG. 9 is a flow diagram 900 including notional representations of macro processes, information interactions, and high level information flows within an aviation process model which utilizes an aircraft departure situational awareness system.

The aircraft departure situational awareness system provides significant benefits over current airline operations (which are illustrated by FIG. 9). By automating the flow of information, delays are eliminated. By providing customized situational awareness and wireless content delivery the right people get the right information at the right time. By providing proactive disruption recovery system-wide, consistent, timely, efficient, and measurable day-of-operation decisions can be made. The result of these advantages to an airline is to reduce and avoid flight departure delays in order to reduce and avoid costs, improve the customer experience, and enhance the airline reputation.

The benefits of creating real-time event broadcast and receipt in an implementation of an aircraft departure situational awareness system includes providing a real-time event notification foundation, customized situational awareness displays for stakeholders, and system-wide disruption recovery recommendations as illustrated in FIG. 9, which illustrates real-time event broadcast and receipt.

Specifically, fueling delivery notification that is currently sometimes delivered on paper, causing delays, is delivered immediately via an electronic transaction. More specifically, customer service operations automatically receives a fueling delivery notification 904 from fueling 906.

A catering plan 910 that is currently sometimes delivered on paper, causing delays, is delivered immediately via an electronic transaction. Flight operations 912 and customer service operations 902 automatically receive the catering plan 910 from catering 914. Operational data (flight) charts 920 that are currently delivered on paper, causing delays, are delivered immediately to flight operations 912 from operational data 922 via an electronic transaction. Baggage (counts) 930 that are currently sometimes delivered on paper from airport authorities 932, causing delays, are delivered immediately to customer service operations 902 via an electronic transaction. A schedule 940 that is currently sometimes delivered on paper from airline governance 942, causing delays, is delivered immediately via an electronic transaction to flight operations 912 and customer service operations 902.

An airline governance part notice 950 (shipping notice) that is currently delivered on paper from airline governance 942, causing delays, is delivered immediately via an electronic transaction to maintenance operations 952. Flight operations (schedule) exceptions 960 that are currently sometimes delivered on paper, causing delays, are delivered immediately via an electronic transaction to maintenance operations 952. Flight operations flight plans 970 are currently produced electronically. Utilizing the aircraft departure situational awareness system, customer service operations 902 automatically receives the flight operations flight plans 970, eliminating delay. Additionally, customer service operations exceptions and updates that are currently sometimes delivered on paper, causing delays, are delivered immediately via an electronic transaction to flight operations 912 from customer service operations 902.

Customer service operations exceptions 980 that are currently sometimes delivered on paper, causing delays, are delivered immediately via an electronic transaction to maintenance operations 952 from customer service operations 902 and customer service operations servicing of waste which is currently sometimes documented on paper, causing delays, is delivered immediately via an electronic transaction. Specifically, airport authorities 932 automatically receive the documentation relating to customer service operations 902 handling of waste. Maintenance operations exceptions and status that are currently sometimes delivered by phone or on paper, causing delays, are delivered immediately to flight operations 912 via an electronic transaction from maintenance operations 952.

To provide the above described real-time situational awareness, an airline operations center (AOC) situational awareness dashboard is configured to provide system-wide visibility of all aspects of the current day of operations factors (from maintenance, stations or external entities) that could affect the ability of the airline to operate according to the published schedule. Further a flight (pilot and co-pilot) and cabin (flight attendant) crew situational awareness dashboard provides operations-wide visibility of all aspects (from AOC) of the current day/week that could affect a published crew schedule.

Additionally, an airline operations administration situational awareness dashboard provides system-wide visibility of critical factors of the current day of operations that could affect the efficiency of the airline operations. To provide the above, alerts are shown on the dashboards and accompanied by audible signals. Alerts are also be immediately communicated to the individuals that need to know and who are affected via a variety of wireless devices. Examples of alert notification include, for example, trends toward fault conditions, occurring fault conditions, and resolution of faults are sent immediately to the AOC manager and operations administrator, changes to crew assignments are sent immediately to the affected flight crews, and changes to the day-of-operations schedule are sent immediately to all affected people in customer service operations and maintenance operations.

A station operations situational awareness dashboard provides airport- and system-wide visibility of all aspects of the current day of operations factors (from maintenance, AOC or external entities) that could affect the ability of the airport to operate according to the day-of-operations schedule. A station operations administration situational awareness dashboard provide airport- and system-wide visibility of critical factors of the current day of operations that could affect the efficiency of the airport operations.

A maintenance operations situational awareness dashboard provides maintenance- and system-wide visibility of all aspects of the current day of operations factors (from customer service, AOC or external entities) that could affect the ability of maintenance to operate according to the day-of-operations schedule. A maintenance operations administration situational awareness dashboard provides maintenance- and system-wide visibility of critical factors of the current day of operations that could affect the efficiency of the maintenance operation.

An automated airline operations recovery recommendation capability provides a system-wide analyses of alternative actions to recover from a disruption that would otherwise negatively affect the day-of-operations schedule. Each recovery presents a set of recommendations and each identify rough cost, ranking according to the priorities of the operations or station administrator, and allow examination of the recovery factors. An operator may choose any one of the recommendations, or implement any other disruption recovery. If one of the automated recovery recommendations is chosen, the automated system orchestrates the implementation by producing a set of electronic transactions to all affected systems to implement the change. In addition, the automated system will immediately alert affected people by a variety of wireless devices.

Alerts are shown on the dashboards and accompanied by audible signals. Alerts are also immediately communicated to the individuals that need to know and who are affected via a variety of wireless devices, for example, trends toward fault conditions, occurring fault conditions, and resolution of faults are sent immediately to the station manager and station administrator and changes to the day-of-operations airport schedule are sent immediately to all affected people in flight operations and maintenance operations.

Figure 10:
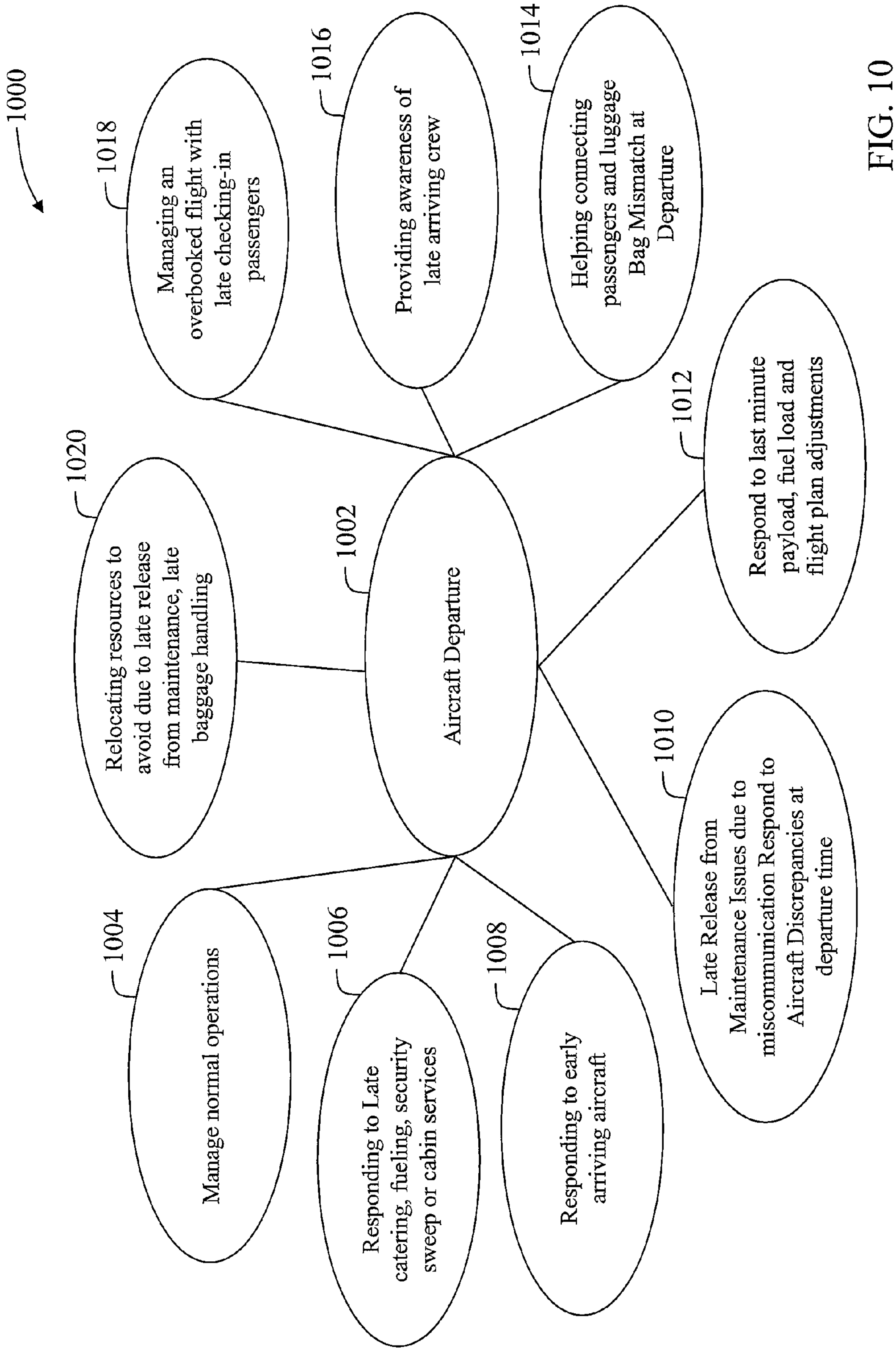
FIG. 10 is a diagram illustrating scenarios relating to aircraft departure situational awareness.

FIG. 10 is a diagram 1000 illustrating scenarios relating to aircraft departure situational awareness 1002 that the above described systems and methods may be utilized to address. Some of the scenarios have been described in further detail above. Though the illustration of FIG. 10 should not be construed to be limiting, the scenarios include: managing normal aircraft/airline operations 1004, responding to late catering, fueling, security, or cabin services 1006, responding to early arriving aircraft 1008, late release of aircraft from maintenance issues due to miscommunications and responses to aircraft discrepancies at departure time 1010. Other managed scenarios include: responding to last minute payload, fuel load, and flight plan adjustments 1012, helping connecting passengers and luggage bag mismatch at departure 1014, providing awareness of late arriving crew 1016, managing an overbooked flight with late checking-in passengers 1018, and reallocating resources to avoid issues due to late aircraft release from maintenance and/or late baggage handling 1020.

FIGS. 11-15 illustrate various status tracking and operational planning scenarios where a provider of information, for example, an airplane, an airport, and/or an airline might provide to the situational awareness system described herein. While many of the described status and operational planning items are related to aircraft departure situational awareness, the described status and operational planning items may be applicable for other situational awareness applications.

Figure 11:
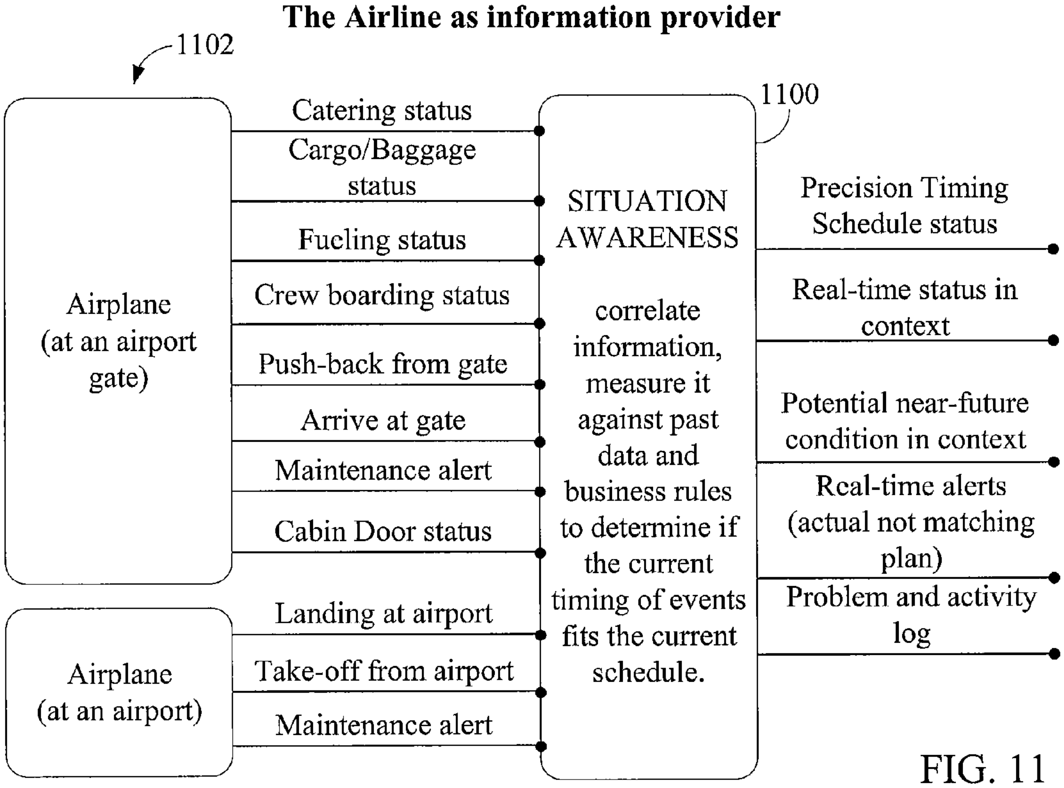
FIG. 11 is a diagram illustrating various status items that an airplane might provide to a situational awareness system.

FIG. 11 is a diagram illustrating various status items that an airplane might provide to a situational awareness system 1100. Situational awareness system 1100, as described with respect to FIGS. 11-15, refers to a computer based system as generally described and configured to perform certain functions as described with respect to FIGS. 1 and 4-7. In the illustrated example, situational awareness system 1100 is configured to receive real time operational status items from an airplane 1102, which may be located at an airport gate, or simply at an airport. Non-limiting examples of the real time operational status items received from an airplane at an airport gate may include a catering status, a cargo/baggage status, a fueling status, a crew boarding status, a push-back from airport gate status, an arrive at airport gate status, a maintenance alert status, and a cabin door status. Non-limiting examples of the real time operational status items received from an airplane at an airport may include a landing at airport status, a take-off from airport status, and a maintenance alert status. Some of the listed items cannot have the same status, for example, landing at airport and take-off from airport.

Based on the operations of the situational awareness systems described above, situational awareness system 1100, based on the received inputs, will provide one or more of a status relating to a precision timing schedule, a context for the real time status of the airplane, any potential or near-future conditions, real-time alerts, and make an entry into a problem and activity log. The outputs provided by situational awareness system 1100, as further described below, will base the above described on data received from additional sources, including, but not limited to, airport providers, and airline providers.

Figure 12:
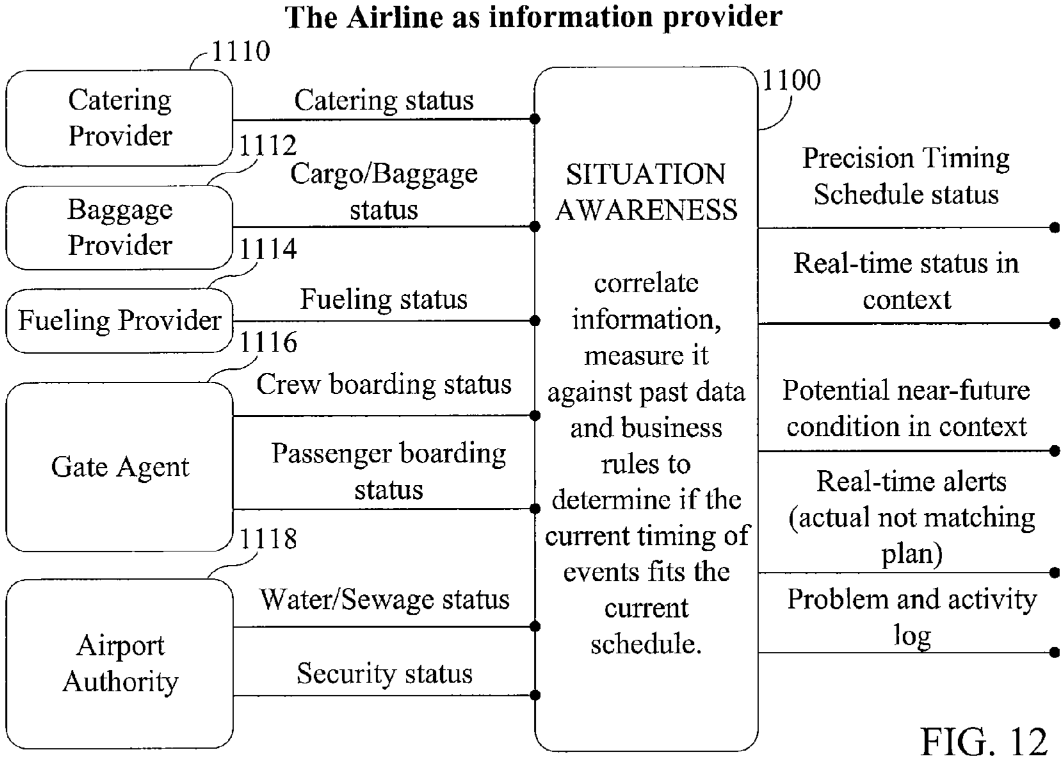
FIG. 12 is a diagram illustrating various status items that an airport might provide to a situational awareness system.

More specifically, FIG. 12 is a diagram illustrating various status items that an airport (including separate entities operating therein) might provide to situational awareness system 1100. It is to be noted that some of the listed status items may be commonly titled, though the provider of such status is different, and therefore the status item may include a particular context, based on the provider. To further clarify, and referring again to FIG. 11, airplane 1102 provides a catering status to situational awareness system 1100. Referring again to FIG. 12, a catering provider 1110 also provides a catering status to situational awareness system 1100. However, as those skilled in the art will understand, a catering status from catering provider 1110 and a catering status from airplane 1102 will likely have different meanings. In one example, a catering status from airplane 1102 may mean that the catered items have (or have not) been loaded onto the aircraft 1102 and the catering status from the catering provider 1110 may indicate that the catered items are (or are not) ready for transport to an airplane. Again, and in summary, similarly titled status and operational plan items may include a context, based on the provider of the information.

Continuing with airport based information providers, a baggage provider 1112 provides a cargo/baggage status to situational awareness system 1100, and a fueling provider 1114 provides a fueling status to situational awareness system 1100. A gate agent 1116 provides one or both of a crew boarding status and a passenger boarding status to situational awareness system 1100, and an airport authority provides one or both of a water/sewage status and a security status to situational awareness system 1100.

Figure 13:
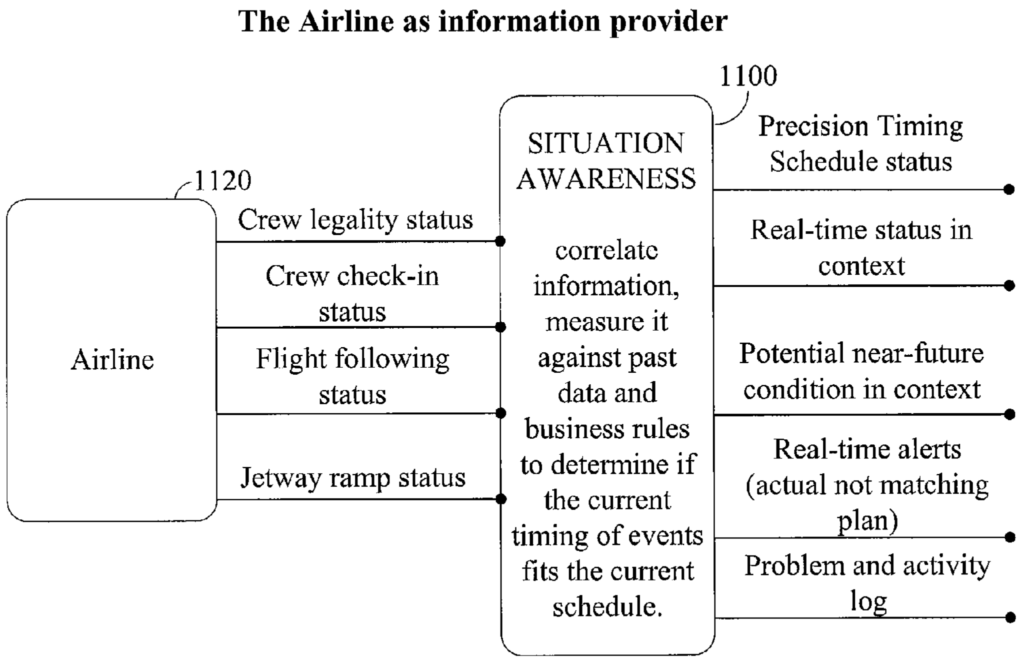
FIG. 13 is a diagram illustrating various status items that an airline might provide to a situational awareness system.

FIG. 13 is a diagram illustrating various status items that airline based information providers 1120 might provide to situational awareness system 1100. For example, airline providers 1120 might provide a status relating to one or more of a crew legality status, a crew check-in status, a flight following status, and a jetway ramp status to situational awareness system 1100.

As described above, situational awareness system 1100, based on the received inputs from one or more of the airplane-based, airport-based, and airline-based information providers, will provide one or more of a status relating to a precision timing schedule, a context for the real time status of the airplane, any potential or near-future conditions, real-time alerts, and make an entry into a problem and activity log for status items.

Figure 14:
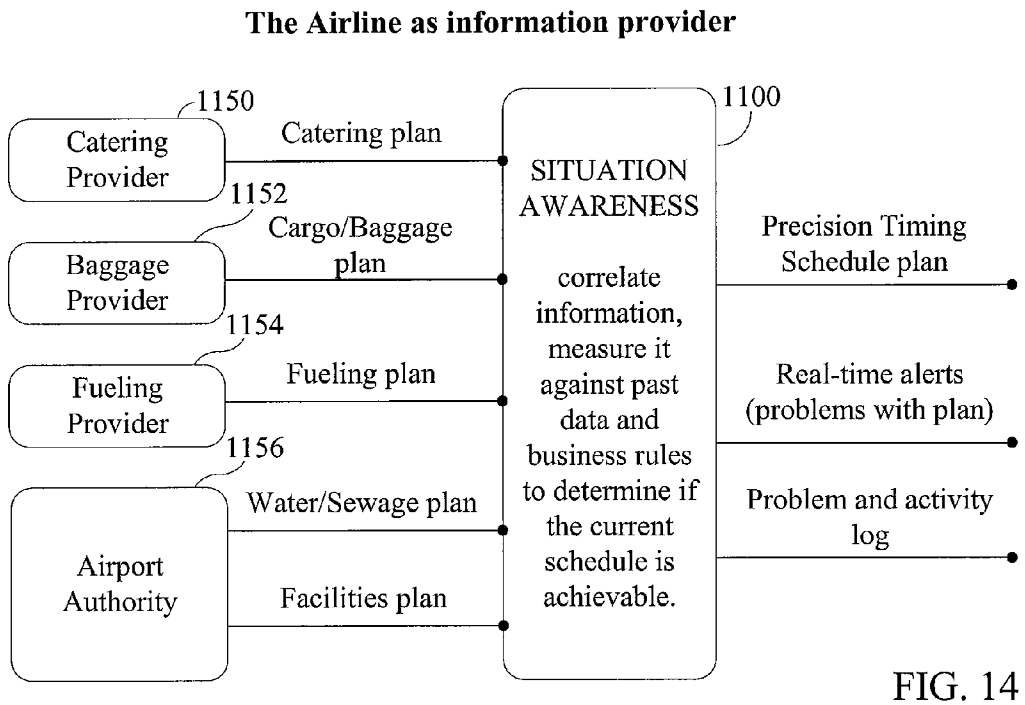
FIG. 14 is a diagram illustrating various operational planning items that an airport might provide to a situational awareness system.

FIG. 14 is a diagram illustrating various operational planning items that various airport-based information providers might provide to situational awareness system 1100. For example, and as illustrated, a catering provider 1150 provides a catering plan to situational awareness system 1100, a baggage provider 1152 provides a cargo/baggage handling plan to situational awareness system 1100, and a fueling provider 1154 provides a fueling plan to situational awareness system 1100. An airport authority 1156 provides one or more of a water/sewage plan and a facilities plan to situational awareness system 1100.

Figure 15:
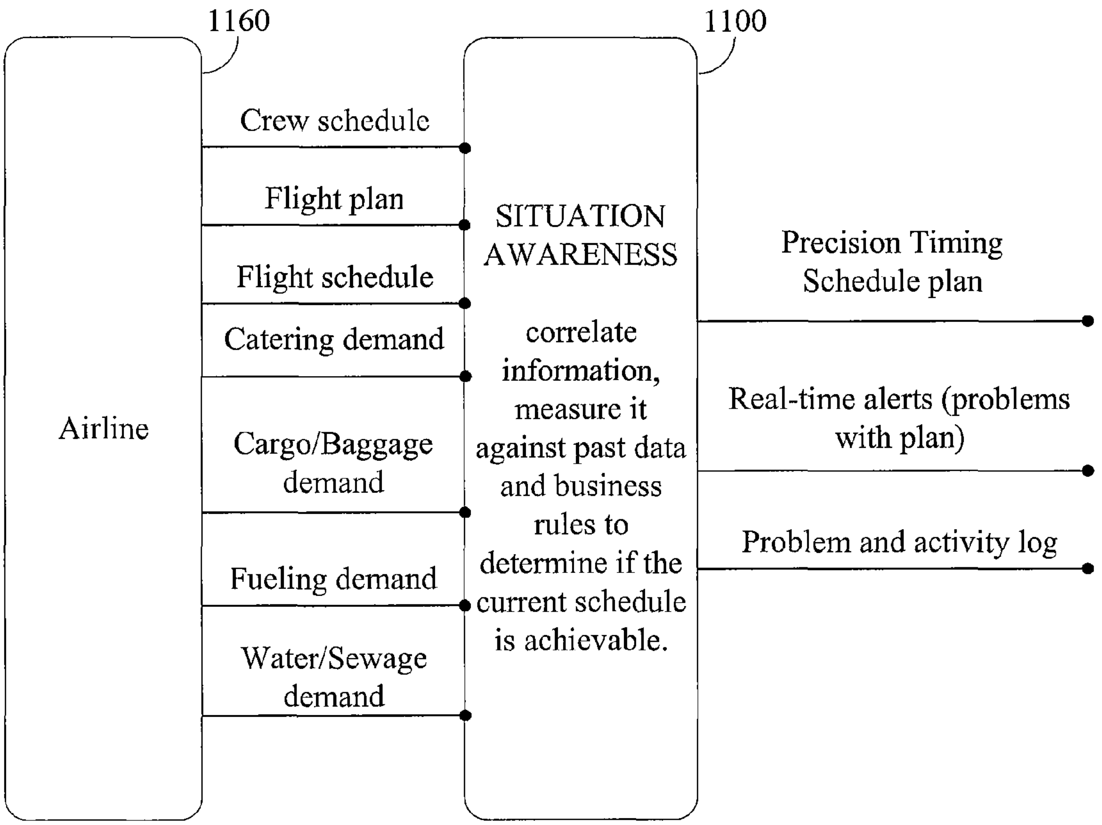
FIG. 15 is a diagram illustrating various operational planning items that an airline might provide to a situational awareness system.

FIG. 15 is a diagram illustrating various operational planning items that an airline-based information provider 1160 might provide to situational awareness system 1100. More particularly, an airline-based information provider 1160 might be configured to provide one or more of crew scheduling, flight planning, flight scheduling, catering demands, cargo/baggage demands, fueling demands, and water/sewage demands to situational awareness system 1100.

With respect to operational planning items provided by airport and airline based providers, situational awareness system 1100 is operable to provide precision time scheduling and planning, real-time alerts (based on problems with the plans), and maintain a problem and activity log.

As will be appreciated by those in the art of airline and airport operations, an awareness of, for example, a long range flight scheduling plan of several months will allow services providers to plan according to the flight schedule. In one particular example scenario, an airline designs a flight schedule containing all departures and arrivals for the fleet for the next several months. The airline analyzes the flight schedule to determine the required ground support (water/sewage, fueling, cargo/baggage, catering, etc.). Ground support vendors provide their schedules based on the airline flight schedule. The situational awareness provided by the systems and methods described herein correlates airline demand for services with vendor plans to provide the required services in the form of a precision timing schedule plan for each departure and arrival. As new airline flight schedules or vendor schedules are received the precision timing schedule reflects the most current information. Discrepancies between schedules up to and including the day of operation are reported immediately to all interested parties at the airline and vendor. As these discrepancies are analyzed and disposed of, a problem activity log provides an authoritative, single-source record of the activity.

Actual events may change relative to scheduling plans. For example, on the day of operation the resources required to accomplish the published flight schedule are monitored to insure conformance to airline and vendor schedules. Example actual airline events include airline crew availability and legality, actual airplane position relative to the filed flight plan and gate (airside and groundside) status. Example actual airport vendor events include equipment and personnel from catering, baggage/cargo, fueling, water/sewage status relative to plan, and airport security alerts (e.g. concourse closure) which represent deviations from the plan. Example actual airplane events include takeoff and landing times, catering, fueling, baggage, crew boarding, and cabin door statuses, and airplane maintenance alerts (e.g. flat tire) which represent deviations from the plan.

The described aircraft departure situational awareness systems and methods correlate the timing of actual events with the plan requirements in the form of a precision timing schedule for each departure and arrival. Discrepancies between schedules and actual events are reported immediately to all interested parties at the airline and vendor. As these discrepancies are analyzed and disposed of, a problem activity log provides an authoritative, single-source record of the activity. New estimated completion information for tasks is used to identify system-wide ripple effects through all other precision timing schedules as determined utilizing the above described decision support system.

With information available from across the extended enterprise, new decision support services and systems result that provide sophisticated recommendations. The power of such a decision support system is useful with respect to, for example, daily flight operational control. Flight operational control decision-making operates within the structured flight schedule planning (long and short run) that has been developed by airline competitive strategy. The above describe decision support system then manages the pre-described flight schedule on a daily basis, helping an airline contend with a highly dynamic environment. Occurrences that affect airline operations, for example, weather, unscheduled equipment maintenance, crew shortages, regulatory factors, and aircraft loading can make the profitable deployment and management of a pre-determined flight schedule very difficult. However, with advances in wireless technologies and standards, to name a few examples, the above described decision support system can provide real-time situational awareness and recovery. Combining, for example, wireless broadband, collaborative decision-making, autonomous software agents, and wearable computing components provides the potential for airline operations where all individual operations are interconnected.

Methods and systems to correlate airline maintenance operations data are described above. Specifically, the systems are implemented such that methods for correlating current data from airline systems and measuring that data against business rules inputted manually by a user or extracted automatically from aircraft technical documents are provided. Users of such a system address daily situations which they must handle to reduce disruptions in airline maintenance operations. Through utilization of the described methods and systems, users have an improved ability to respond to unscheduled maintenance by having information delivered relevant to solve the problem. As current data is captured into the system, for example, current airline issues, this data is compared against the enterprise knowledge store which is described above.

User interactions with the situational awareness system are accomplished through one or more software applications that are delivered, for example, over an airline's computer network or through the internet. In any event, user interaction provides an ability to access the situational awareness from any device with access to the airlines network or the internet, and results in better decision making capabilities, reduced learning curves, system wide awareness, and commonality between applications.

The advantages realized by an aircraft departure situational awareness system include informed real-time decision making by all participants, expediting analysis and increasing a decision making window for the participants. Additionally, resource and asset allocation is optimized for all aircraft departures resulting in predictive system wide disruption management for improvement in schedule reliability. Further, such a system also enables better management by capturing measurable data for post analysis and improvement, optimizes gate and aircraft utilization. With regard to employee/contractor assets, the system empowers such individuals and encourages proactive decision making. The system may also be configured to empower customers by providing current and accurate aircraft departure situational awareness.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While the invention has been described in terms of various specific embodiments, those skilled in the art will recognize that the invention can be practiced with modification within the spirit and scope of the claims.

What is claimed is:

1. A method for providing an enterprise with a situational awareness for conditions related to aircraft departure, said method comprising:

receiving data related to one or more events that have the potential to affect conditions related to an aircraft's departure from a plurality of enterprise related systems;

correlating the received data in accordance with one or more business rules;

generating an aircraft departure situational awareness data set from the correlated data;

processing the aircraft departure situational awareness data set based on characteristics of at least one user profile; and providing at least one recommendation, each recommendation associated with one user profile, directed to addressing the conditions related to aircraft departure.

2. A method according to claim 1 further comprising interpreting the correlated data in view of historical data.

3. A method according to claim 1 wherein receiving data further comprises:

receiving data from a first portion of the enterprise systems which are located on board aircraft; and receiving data from a second portion of the enterprise systems which are ground based, including at least one of an airline-based system, an airport-based system, and air traffic service providers.

4. A method according to claim 1 wherein processing the aircraft departure situational awareness data set comprises providing a view of the viewable aircraft departure situational awareness data set based on the user profile associated with the user.

5. A method according to claim 4 wherein providing a view of the viewable aircraft departure situational awareness data set comprises presenting the user with data from the aircraft departure situational awareness data set that is relevant for a function of the user.

6. A method according to claim 1 wherein processing the aircraft departure situational awareness data set comprises identifying at least one of an implementation cost and a resulting deviation from schedule associated with the situation related to aircraft departure.

7. A method according to claim 6 wherein identifying at least one of an implementation cost and a resulting deviation from schedule associated with the situation related to aircraft departure comprises analysis of future airline schedule and future ground support schedules from multiple sources.

8. A method according to claim 6 wherein identifying at least one of an implementation cost and a resulting deviation from schedule associated with the situation related to aircraft departure comprises analysis of the integrated day-of-operations airplane departure plan and the timing of actual events for all required resources from multiple sources.

9. A method according to claim 6 wherein identifying at least one of an implementation cost and a resulting deviation from schedule associated with the situation related to aircraft departure comprises calculation of implementation cost of no performing any intervention and each recovery recommendation.

10. A method according to claim 1 wherein receiving data related to one or more events comprises receiving data from one or more of airline management and operations, maintenance operations, aircraft, airport management and operations, aircraft suppliers, regulatory authorities and independent airport service providers.

11. A method according to claim 1 wherein providing at least one recommendation comprises providing at least one recommendation for one or more of airline operations, airport operations, and vendor operations, including data related to how best to address the conditions associated with the aircraft, and based at least partially on the generated aircraft departure situational awareness data set.

12. A method according to claim 1 wherein processing the aircraft departure situational awareness data set comprises providing real-time alerts of deviations to users.

13. A method according to claim 12 wherein providing real-time alerts of deviations to users comprises notification of future potential conflicts between business entities.

14. A method according to claim 1 wherein receiving data related to one or more events comprises receiving at least one of status tracking information and operational planning information from at least one of an airplane, an airport, and an airline.

15. A method according to claim 14 wherein receiving at least one of status tracking information and operational planning information from an airport comprises receiving information from at least one of airline operations, airport operations, and vendor operations.

16. A method according to claim 14 wherein receiving operational planning information comprises receiving at least one of an airline designed flight schedule containing all departures and arrivals for the fleet for a time period, cabin and flight crew schedules, passenger information, and airport support personnel schedules.

17. A method according to claim 16 wherein correlating the received data in accordance with one or more business rules comprises:

analyzing the flight schedule, and projected passenger and cargo load to determine the required ground support;

receiving ground support schedules based on the airline flight schedule; and correlating an airline demand for services with vendor plans to provide the required services in the form of a precision timing schedule plan for each aircraft departure and arrival.

18. A method according to claim 17 wherein processing the aircraft departure situational awareness data set in view of at least one user profile comprises:

updating the precision timing schedule to reflect the most current information as new airline flight schedules and vendor schedules are received; and reporting discrepancies between schedules up to and including the day of operation to all interested parties at the airline and vendor.

19. A method according to claim 18 further comprising maintaining a problem activity log for the discrepancies as they are analyzed and disposed.

20. A method according to claim 1 wherein processing the aircraft departure situational awareness data set comprises correlating timing of actual events with scheduling plan requirements in the form of a precision timing schedule for each departure and arrival.

21. A method according to claim 20 wherein providing at least one recommendation directed to addressing the conditions related to aircraft departure comprises using new estimated completion information to identify ripple effects through all other precision timing schedules.

22. A method according to claim 21 wherein using new estimated completion information to identify system-wide ripple effects through all other precision timing schedules comprises multiple views of the information, including system-wide, by individual airport, and for other carriers for which the vendor is contracted for service.

23. A method according to claim 21 wherein processing said decision support system is configured to allow a user to select one of presented recommendations or choose another solution.

24. An aircraft departure situational awareness system comprising:

at least one user interface;

a plurality of enterprise systems;

an integration system networked to said interface and configured to receive data relating to aircraft departure situational awareness from said plurality of enterprise systems; and a decision support system integrated with said integration system and said user interface, said decision support system operatively configured to correlate situational information that has the potential to affect conditions related to aircraft departure received from said plurality of enterprise systems with one or more business rules received from said integration system, said decision support system further configured to generate an aircraft departure situational awareness data set from the correlated data, process the aircraft departure situational awareness data set based on characteristics of at least one user profile, and provide at least one recommendation for display on at least one of said user interfaces, each recommendation associated with a user profile, and directed to addressing the conditions related to aircraft departure.

25. A system according to claim 24 wherein said decision support system is configured to communicate chosen recovery solution decisions in real-time to all affected users.

26. A system according to claim 24 wherein said decision support system is configured to interpret the correlated situational information in view of historical data.

27. A system according to claim 24 wherein a first portion of said enterprise systems are located on board aircraft, and a second portion of said enterprise systems are ground based.

28. A system according to claim 24 wherein said decision support system is configured to cause said at least one user interface to provide a view of the viewable aircraft departure situational awareness data set based on the user profile associated with a user.

29. A system according to claim 24 wherein said decision support system is configured to provide at least one user interface at least one of an implementation cost and a resulting deviation from schedule associated with the data relating to aircraft departure situational awareness received from said plurality of enterprise systems.

30. A system according to claim 24 wherein said plurality of enterprise systems comprise at least one of airline management and operation systems, maintenance operations systems, aircraft systems, airport management and operations systems, aircraft supplier systems, regulatory authority systems and independent airport service provider systems.

31. A system according to claim 24 wherein said system configured to generate a data set for one or more of maintenance operations users, airline flight operations center users, airline management users, station operations users, vendor operations users, and passenger services users, the data received from said enterprise systems including data related to a condition of an aircraft in need of one or more resources, the at least one recommendation from said decision support system including data related to how best to address the conditions associated with the aircraft.

32. A system according to claim 24 wherein said decision support system is configured to receive at least one of status tracking information and operational planning information from at least one of an airplane, an airport, and an airline.

33. A system according to claim 24 wherein said decision support system is configured to receive airline designed flight schedule containing all departures and arrivals for the fleet for a time period.

34. A system according to claim 33 wherein said decision support system is configured to:

analyze the flight schedule to determine the required ground support;

receive ground support schedules based on the airline flight schedule; and correlate an airline demand for services with vendor plans to provide the required services in the form of a precision timing schedule plan for each aircraft departure and arrival.

35. A system according to claim 34 wherein said decision support system is configured to:

update the precision timing schedule to reflect the most current information as new airline flight schedules and vendor schedules are received; and report discrepancies between schedules up to and including the day of operation to all interested parties at the airline and vendor.

36. A system according to claim 35 wherein said decision support system is configured to maintain a problem activity log for the discrepancies as they are analyzed and disposed.

37. A system according to claim 24 wherein said decision support system is configured to correlate timing of actual events with scheduling plan requirements in the form of a precision timing schedule for each departure and arrival.

38. A system according to claim 24 wherein said decision support system is configured to use updated estimated completion information to identify system-wide ripple effects through all other precision timing schedules.

39. A system according to claim 24 wherein said system configured to generate real-time alerts of deviations to appropriate users.

40. A system according to claim 39 wherein said real-time alerts system configured to generate real-time alerts of deviations between plans from multiple business units.

41. A system according to claim 39 wherein said real-time alerts system configured to generate real-time alerts of deviations between the integrated plan and timing of actual day-of-operations events.

42. A system according to claim 24 wherein said decision support system is configured to allow a user to select one of presented recommendations or choose another solution.

* * * * *